United States Patent
Bennett et al.

(10) Patent No.: US 11,167,842 B2
(45) Date of Patent: Nov. 9, 2021

(54) MOUNT FOR SUPPORTING A COMPONENT AND ATTENUATING NOISE

(71) Applicant: Bell Helicopter Textron Inc., Fort Worth, TX (US)

(72) Inventors: Jon Damon Bennett, Melbourne, FL (US); Joshua Allan Edler, Dallas, TX (US); Matthew Wade Hendricks, Grand Prairie, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 401 days.

(21) Appl. No.: 15/728,989

(22) Filed: Oct. 10, 2017

(65) Prior Publication Data

US 2019/0106203 A1 Apr. 11, 2019

(51) Int. Cl.
*B64C 27/00* (2006.01)
*B64C 27/08* (2006.01)
(Continued)

(52) U.S. Cl.
CPC ............ *B64C 27/001* (2013.01); *B64C 27/08* (2013.01); *B64D 27/26* (2013.01); *B64C 2027/002* (2013.01); *B64D 2041/002* (2013.01)

(58) Field of Classification Search
CPC ....... B64C 27/001; B64C 27/46; B64C 27/26; B64C 27/08; B64D 27/26; B64D 2041/002
See application file for complete search history.

(56) References Cited

U.S. PATENT DOCUMENTS

| | | | | |
|---|---|---|---|---|
| 2,615,657 A | * | 10/1952 | Young | B64C 27/001 244/17.27 |
| 3,163,378 A | * | 12/1964 | Balke | B64C 27/001 244/17.27 |

(Continued)

FOREIGN PATENT DOCUMENTS

| | | |
|---|---|---|
| EP | 2179922 A1 | 4/2010 |
| EP | 3470331 A1 | 4/2019 |
| WO | 2017053634 A1 | 3/2017 |

OTHER PUBLICATIONS

EPO Search Report issued in EP Application 18151047.0 dated Jun. 13, 2018, 4 pages.

(Continued)

*Primary Examiner* — Medhat Badawi
*Assistant Examiner* — Vicente Rodriguez
(74) *Attorney, Agent, or Firm* — Patent Capital Group

(57) ABSTRACT

One example of a mount for a rotorcraft comprises a structural support member, a bracket, and an elastomer. The bracket is configured to attach to a component of the rotorcraft. The component of the rotorcraft produces vibrations at a first frequency. The structural support member configured to transfer a weight of the component of a rotorcraft to an airframe of the rotorcraft. A rotor system of the aircraft vibrates the airframe of the rotorcraft at a second frequency. The elastomer is located between a structural support member and a bracket. The elastomer is configured to attenuate noise caused by the vibrations at the first frequency by isolating the vibrations at the first frequency from reaching the airframe of the rotorcraft while the airframe vibrates at the second frequency.

8 Claims, 16 Drawing Sheets

(51) Int. Cl.
*B64D 27/26* (2006.01)
*B64D 41/00* (2006.01)

(56) References Cited

U.S. PATENT DOCUMENTS

| | | | | |
|---|---|---|---|---|
| 3,698,663 | A * | 10/1972 | Balke | B64C 27/001 |
| | | | | 244/17.27 |
| 3,907,220 | A * | 9/1975 | Amelio | B64D 27/18 |
| | | | | 244/54 |
| 4,111,386 | A * | 9/1978 | Kenigsberg | B64C 27/001 |
| | | | | 244/17.27 |
| 4,236,607 | A * | 12/1980 | Halwes | B64C 27/001 |
| | | | | 188/379 |
| 4,362,281 | A * | 12/1982 | Cresap | B64C 27/001 |
| | | | | 188/379 |
| 5,641,133 | A * | 6/1997 | Toossi | B64C 27/001 |
| | | | | 244/117 R |
| 5,788,182 | A * | 8/1998 | Guimbal | B64C 27/001 |
| | | | | 244/17.11 |
| 2008/0142633 | A1 | 6/2008 | McGuire et al. | |
| 2013/0134257 | A1 * | 5/2013 | Barber | B64D 27/26 |
| | | | | 244/54 |
| 2013/0270415 | A1 * | 10/2013 | Lee | F16F 7/00 |
| | | | | 248/638 |
| 2015/0139575 | A1 * | 5/2015 | Romano | F16C 11/0628 |
| | | | | 384/125 |

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Perry, Dominic, "ANALYSIS: Bell 525 Relentless Cutaway and Technical Description", Flight Global, Flight International, Bell Helicopter, Published Nov. 12, 2014. (8 pages).

"Rotor Track & Balance," Rotor & Wing Aviation Services, Malaysia, available online at <https://web.archive.org/web/20030815000305/http://www.rwas.com.au/rtb.html> available at least as early as Aug. 15, 2003 (10 pages).

Bir, G., "Multiblade Coordinate Transformation and Its Application to Wind Turbine Analysis," Conference Paper, NREL-CP-500-42553, 2008 ASME Wind Energy Symposium, Reno Nevada, Jan. 7-10, 2008 (17 pages).

EPO Examination Report issued in EP Application 18151047.0 dated Jul. 2, 2018, 7 pages.

EPO Examination Report issued in EP Application 18151047.0 dated Jan. 15, 2019, 6 pages.

* cited by examiner

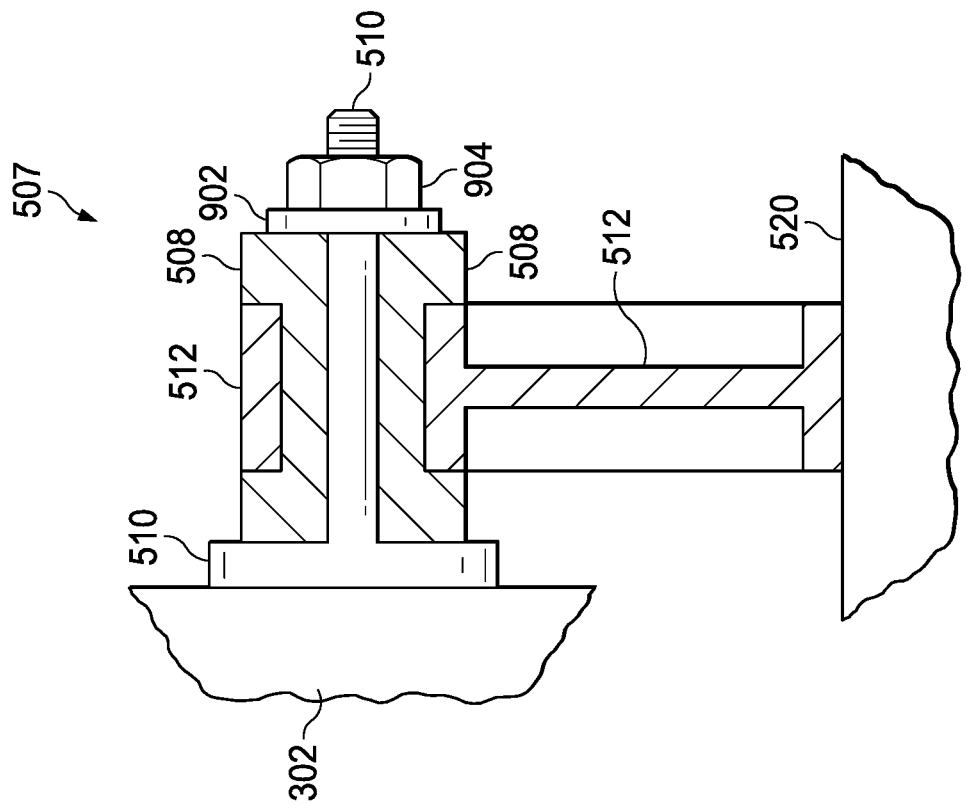
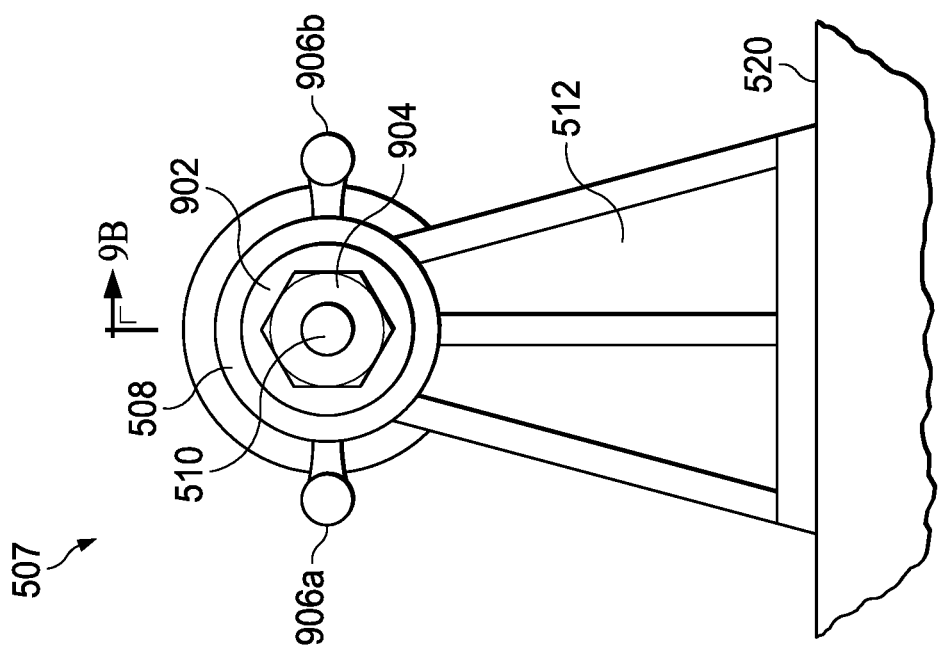
FIG. 9B
FIG. 9A

MOUNT FOR SUPPORTING A COMPONENT AND ATTENUATING NOISE

TECHNICAL FIELD

This disclosure relates generally to aircraft mounts, and more particularly, though not exclusively, to mounts for supporting an aircraft component and reducing vibrations of the component that cause acoustic noise.

BACKGROUND

Aircraft are subjected to various forces during operation. An airframe of an aircraft is a structural frame to which other components of the aircraft are attached. During operation some aircraft components cause vibrations, which can be transmitted to the airframe thereby causing the airframe to vibrate. For example, rotors are a source of major vibrations that are transmitted to the airframe. In addition, other aircraft systems (e.g., control and operation systems) include components that transmit vibrations to the airframe. Excessive vibrations during operation of an aircraft are undesirable and potentially harmful to the aircraft, as they can negatively impact the structural integrity, mechanical integrity, and performance of the aircraft. For example, vibration can cause components of an aircraft to bend and may reduce the structural integrity and fatigue life of the aircraft. Moreover, vibration is undesirable to operators and passengers of an aircraft, as vibration may cause the aircraft to shake and/or produce loud acoustic noise, which may distract the operators and negatively impact the comfort of the passengers.

SUMMARY

According to one aspect of the present disclosure an elastomer is located between two or more rigid members (e.g., a bracket and/or a structural support member). At least one of the rigid members is coupled to a component of an aircraft and at least another of the rigid members is coupled to an airframe of the aircraft. The component of the aircraft produces vibrations at a first frequency while the airframe vibrates at the second frequency. The elastomer is configured to attenuate acoustic noise caused by the vibrations at the first frequency by isolating the vibrations at the first frequency from reaching the airframe of the aircraft while the airframe vibrates at the second frequency.

According to another aspect of the present disclosure a mount for an aircraft comprises a structural support member, a bracket, and an elastomer. The bracket is configured to attach to a component of the aircraft. The component of the aircraft produces vibrations at a first frequency. The structural support member configured to transfer a weight of the component of the aircraft to an airframe of the aircraft. A rotor system of the aircraft vibrates the airframe of the aircraft at a second frequency. The elastomer is located between a structural support member and a bracket. The elastomer is configured to attenuate noise caused by the vibrations at the first frequency by isolating the vibrations at the first frequency from reaching the airframe of the aircraft while the airframe vibrates at the second frequency.

According to another aspect of the present disclosure a rotorcraft comprises an airframe configured to support components of the rotorcraft. The components comprise an aircraft system, a rotor system, and a mount. The aircraft system comprises at least one oscillating element. The aircraft system is configured to produce vibrations at a first frequency based on oscillations of the at least one oscillating element. The rotor system comprises a plurality of rotors configured to rotate and generate thrust to propel the rotorcraft. The plurality of rotors cause the rotor system to vibrate the airframe at a second frequency during rotation. The mount is configured to couple the aircraft system to the airframe and to attenuate noise caused by the vibrations at the first frequency. The mount comprises a first rigid member, a second rigid member, and an elastomer located between the first rigid member and the second rigid member. The first rigid member is configured to transfer a weight of a component of the rotorcraft to the airframe. The second rigid member is configured to (e.g., directly) attach to the component of the rotorcraft. The second rigid member receives the weight of the component and transfers the weight to the first rigid member via the elastomer. The elastomer is configured to isolate the vibrations at the first frequency from reaching the airframe of the rotorcraft while the rotor system vibrates the airframe at the second frequency.

BRIEF DESCRIPTION OF THE DRAWINGS

FIGS. 9A, 9B, 10, 11, 12A, 12B, 13, 14, 15, and 16 are cross-sectional views of the exemplary noise reducing mounts of FIG. 5, 6, 7, or 8.

DETAILED DESCRIPTION

Figure 1A:
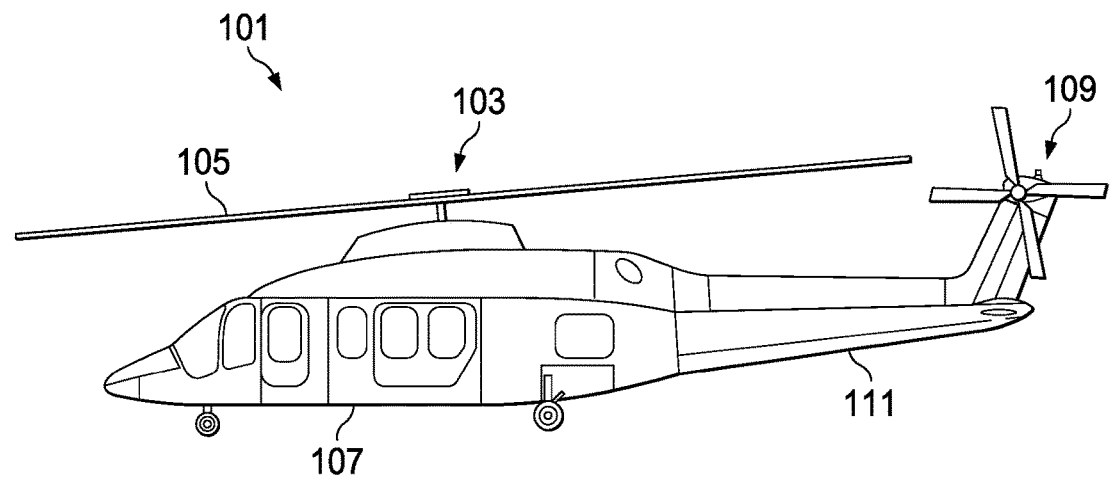
FIGS. 1A, 1B, and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
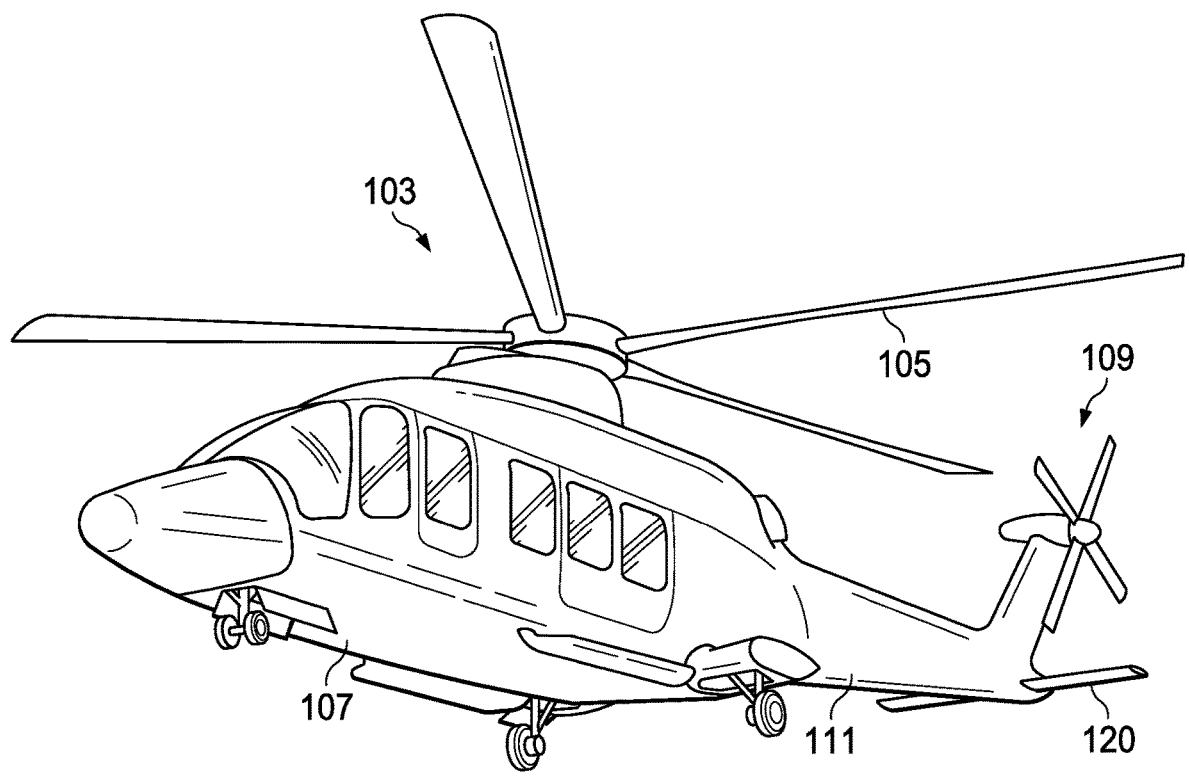

FIGS. 1A and 1B illustrate an example embodiment of an aircraft, which in this case is a rotorcraft 101. FIG. 1A illustrates a side view of the rotorcraft 101, while FIG. 1B illustrates a perspective view of the rotorcraft 101. Rotorcraft 101 includes an airframe (hidden beneath the outer mold line of the rotorcraft) and a rotor system 103 coupled to the airframe. The rotor system 103 comprises with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, and a tail structure 120, each of which is attached to the airframe. In the illustrated embodiment, tail structure 120 may be used as a horizontal stabilizer. Torque is supplied to rotor system 103 and anti-torque system 109 using at least one engine. The rotorcraft 101 includes a variety of cowling assemblies configured to cover or protect components of the rotorcraft 101 and reduce aerodynamic drag. One example cowling assembly is arranged above aircraft systems including an auxiliary power unit (APU) and an engine (e.g., as described in Further detain with respect to FIG. 3). Another example cowling assembly is arranged above aircraft systems including an accessory gear box (AGB) and an environmental control unit (ECU) (e.g., as described in further detain with respect to FIG. 4). Each of these components (e.g., the AGB, ECU, APU, and engine) produce vibrations, which may be transmitted to the airframe of the rotorcraft 101.

Figure 2:
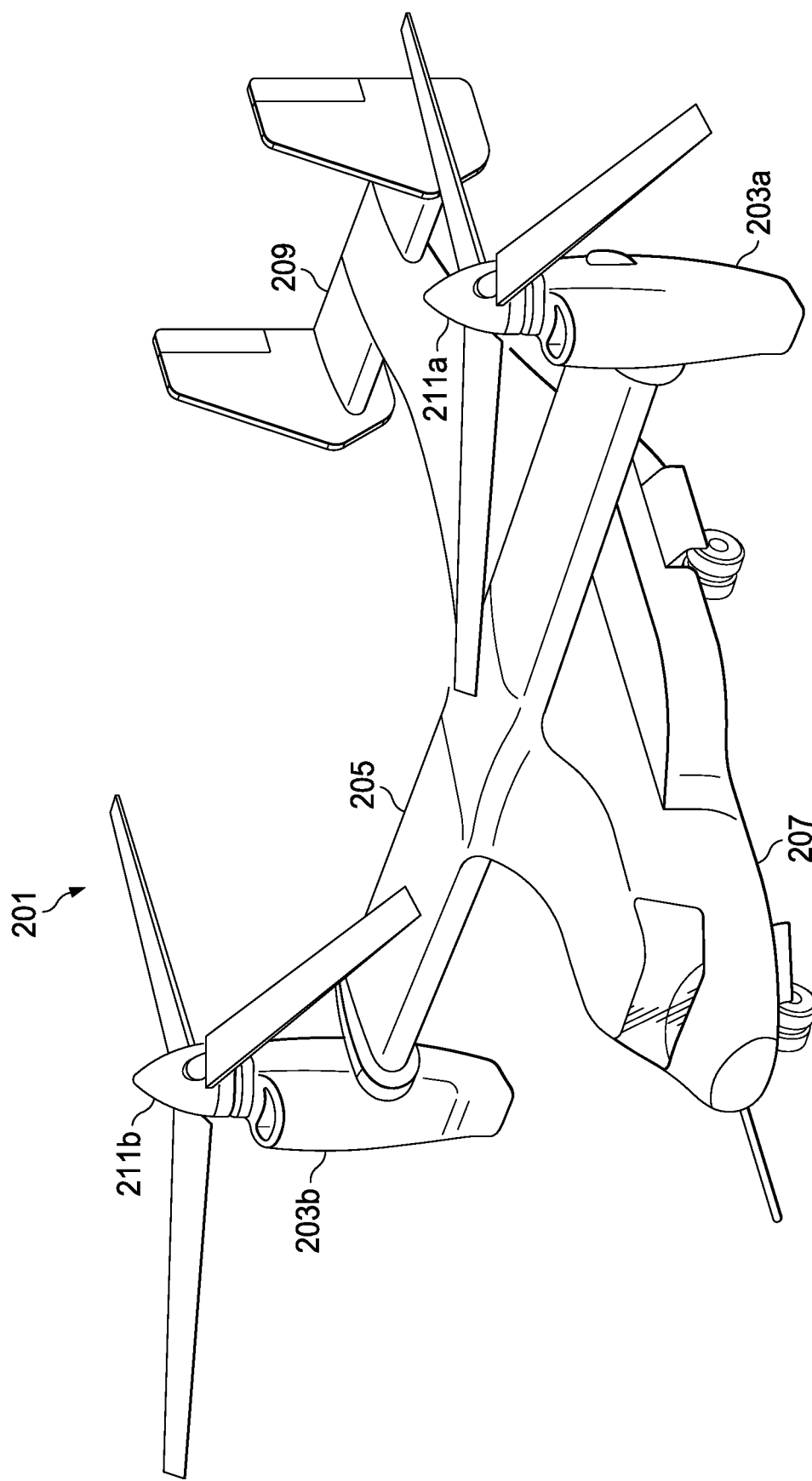

FIG. 2 illustrates a perspective view of an example an aircraft, which in this case is a tiltrotor aircraft 201. Tiltrotor aircraft 201 can include nacelles 203a and 203b, a wing 205, a fuselage 207, and a tail member 209, each of which is coupled to an airframe of the tiltrotor aircraft 201 (hidden beneath the outer mold line of the tiltrotor aircraft 201). Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal. The tiltrotor aircraft 201 includes a variety of cowling assemblies configured to cover or protect components of the tiltrotor aircraft 201 and reduce aerodynamic drag. Such cowling assembly may cover AGB, ECU, and APU onboard the tiltrotor aircraft 201 (similar to those on the rotorcraft 101 of FIGS. 1A, 1B, 3, and 4), which produce vibrations that may be transmitted to the airframe of the tiltrotor aircraft 201.

It should be appreciated that the rotorcraft 101 of FIGS. 1A and 1B and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Rotors (e.g., rotor system 103 on the rotorcraft 101 and rotor systems 211a and 211b of the tiltrotor aircraft 201) are a major source of vibrations affecting an airframe of an aircraft. The rotor system rotates blades at a rotational frequency (or "$\Omega$"). During operation, when all of the blades of the rotor system are rotating, the blades collectively cause structures supporting the blades (e.g., a mast supporting the blades, an airframe to which the mast is attached) to vibrate. The frequency of such vibrations is referred to as N per revolution (commonly abbreviated and referred to herein as "N-per-rev") and is a function of, among other things, the number of blades, "N", in the rotor system (i.e., assuming identical rotor blades are equally spaced around a rotor hub and moving at a constant rotational velocity). In particular, the N-per-rev is a frequency that is an integer multiple of the rotational frequency, $\Omega$, of the rotor system, where the integer is the number of blades in the system. For example, a rotor system operating at a rotational frequency of 5 Hz and comprising 3 blades has an N-per-rev equal to 3*5 Hz or 15 Hz. Likewise, a rotor system operating at the same rotational frequency and comprising 5 blades has an N-per-rev equal to 5*5 Hz or about 25 Hz. The rotor system is a major source of direct vibrations at N-per-rev, which are transmitted to the airframe. The vibrations of the rotor system cause other components to vibrate at the N-per-rev frequency even while such other components also produce vibrations at other frequencies.

Figure 3:
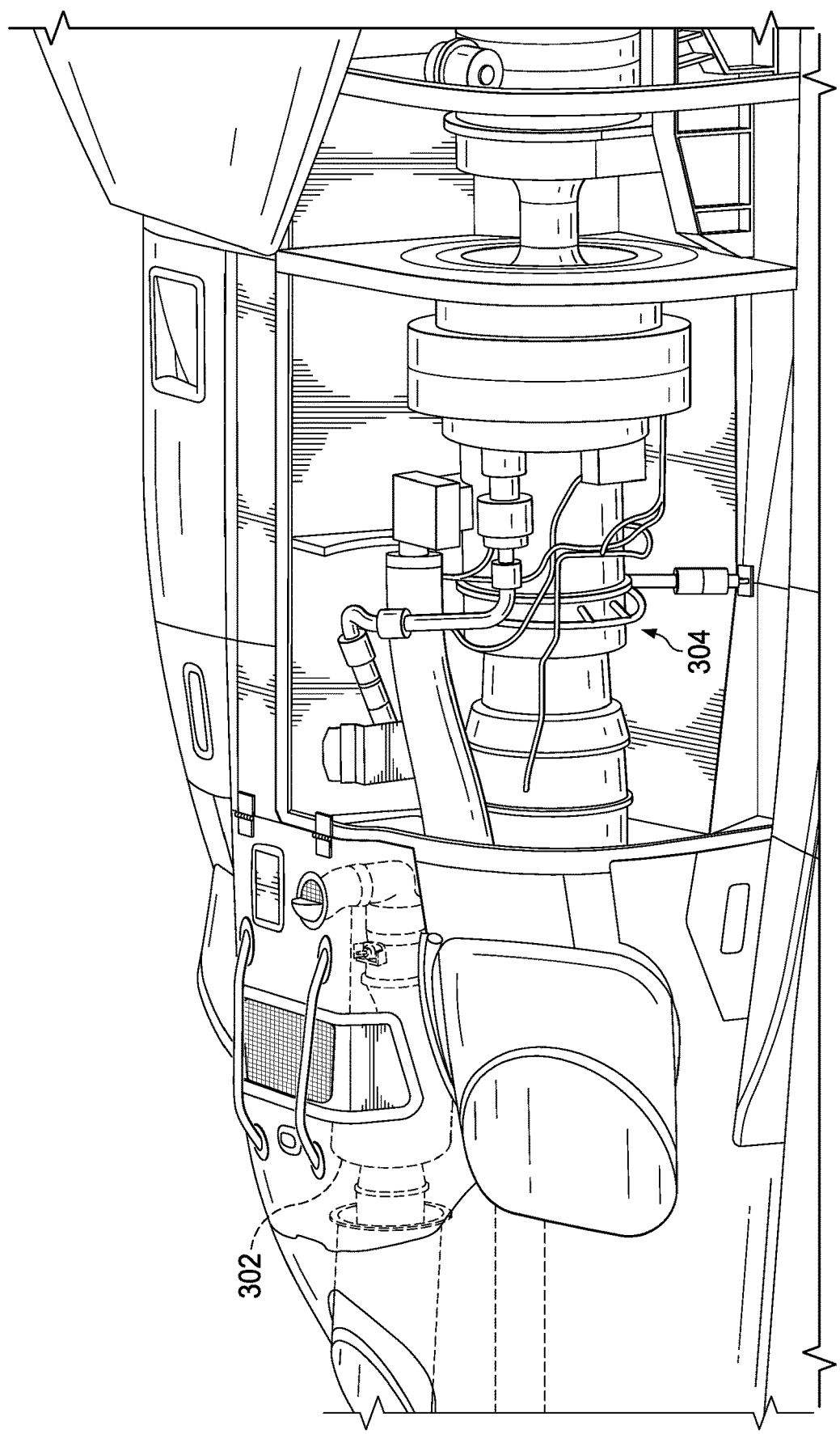
FIGS. 3 and 4 are cutaway views of an example aircraft in accordance with certain embodiments.
Figure 4:
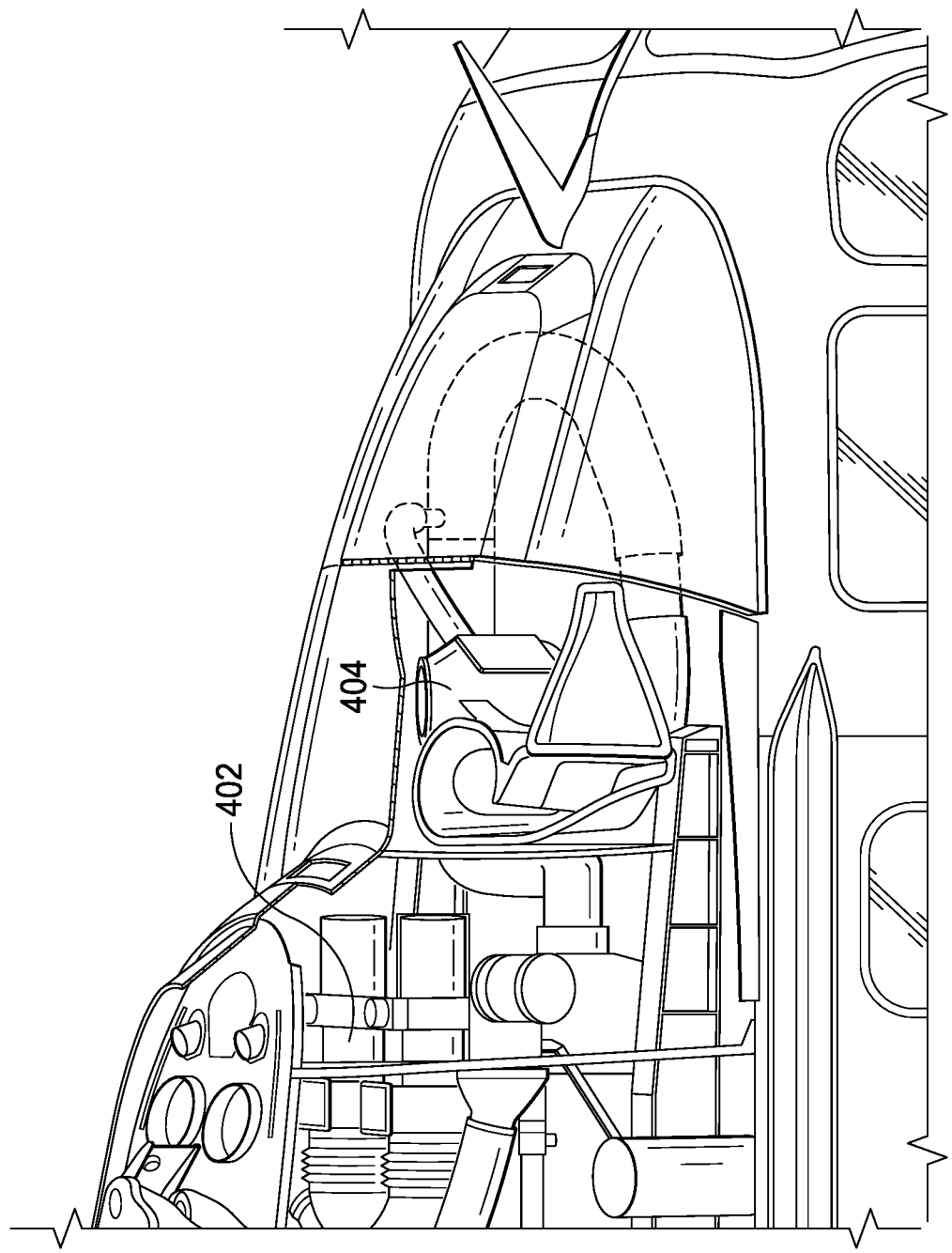

Vibration producing components on the aircraft can produce noise on the aircraft. For example, FIGS. 3 and 4 are cutaway views of the rotorcraft 101 of FIGS. 1A and 1B and illustrate a general context for the location of several components. FIG. 3 is a partial cutaway view of the rotorcraft 101 showing an auxiliary power unit (APU) 302 and an engine 304, which are located on top of the rotorcraft 101 and under a cowling. The APU 302 comprises a small turbine engine (or electrical motor) that can be started using only electricity for power and is used to help to start the engine 304. The engine 304 is the primary source of power and torque for the rotorcraft 101. Both the APU 302 and the engine 304 include spinning and/or oscillating components (e.g., drive shafts, gears, and the like), which cause vibrations that can be transmitted to the airframe of the rotorcraft 101. FIG. 4 is a partial cutaway view of the rotorcraft 101 showing an accessory gear box (AGB) 402 and an environmental control unit (ECU) 404, which are located on top of the rotorcraft 101 and under a cowling. The AGB 402 receives at least a portion of its power input from the engine 304 and turns blowers for a main gear box cooler, generators, and hydraulics. The ECU 404 controls the interior environment of the rotorcraft 101 (e.g., a heating venting and cooling (HVAC) system). The ECU 404 comprises a compressor that revolves at a high frequency (e.g., tens of thousands of revolutions per minute (RPM)). Both the AGB 402 and the ECU 404 include spinning and/or oscillating components (e.g., gears, compressors, and the like), which cause vibrations that can be transmitted to the airframe of the rotorcraft 101. The vibrations produced by such components (e.g., APU 302, engine 304, AGB 402, and ECU 404) cause the airframe of the rotorcraft 101 to shake and/or produce loud noise, which may distract the operators and negatively impact the comfort of the passengers.

Thus, a key challenge is to reduce noise caused by vibrations of components (e.g., APU 302, engine 304, AGB 402, and ECU 404) on an aircraft. The problem of mitigating these vibrations is made more challenging because the entire airframe may also be vibrating at N-per-rev. For example, vibrations produced by the components should not exacerbate the N-per-rev vibrations of the airframe; nor should the N-per-rev vibrations (e.g., received from the airframe) exacerbate the vibration of the components.

A possible solution is to use sound absorbing material such as insulating blankets that wrap a cabin of the aircraft (e.g., in an effort to prevent noise from reaching the cabin where it can distract a pilot and/or passengers). However, such blankets add additional weight to the aircraft. In addition, some blankets consume significant space due to a thickness of the blanket. These blankets may be too bulky for some implementations.

It is noted that while the FIGS. 3 and 4 are described in the context of the rotorcraft 101, the tiltrotor aircraft 201 may include components identical or similar to the APU 302, the engine 304, the AGB 402, and the ECU 404. Moreover, many of the examples in the present disclosure are described relative to the components of the rotorcraft 101 only for simplicity. The teachings and examples of the present disclosure are equally applicable to the tiltrotor aircraft 201 and other aircraft. In addition, the APU 302, the engine 304, the AGB 402, and the ECU 404 are examples of aircraft systems that produce vibrations. However, the teachings and examples of the present disclosure are not limited to these examples and are equally applicable to other aircraft systems that produce vibrations.

The systems, apparatuses, elastomers, and mounts described in the present disclosure address the challenges discussed above (as well as other challenges). For example, an elastomer, as disclosed herein, can be fitted between rigid members. At least one of the rigid members is coupled to a component of an aircraft and at least another of the rigid members is coupled to an airframe of the aircraft. The component of the aircraft produces vibrations at a first frequency while the airframe vibrates at the second frequency. The elastomer is configured to attenuate noise caused by the vibrations at the first frequency by isolating the vibrations at the first frequency from reaching the airframe of the aircraft while the airframe vibrates at the second frequency. The elastomer prevents direct contact between the rigid members (e.g., prevents metal-to-metal contact), which could lead to transmission of vibrations between the component and the airframe. As another example, a mount, as disclosed herein, supports the weight of a component (e.g., APU 302, engine 304, AGB 402, and/or ECU 404) and substantially prevents the vibrations of the component from reaching the airframe even while the airframe is vibrating at N-per-rev. Such a mount may comprise a structural support member to transfer a weight of a component to an airframe of a rotorcraft, a bracket to attach to the component of the rotorcraft, and an elastomer fitted between the structural support member and the bracket. The component of the rotorcraft produces vibrations, e.g., at a first frequency. The elastomer attenuates noise caused by the vibrations at the first frequency by isolating the vibrations at the first frequency from reaching the airframe of the rotorcraft while a rotor system of the aircraft vibrates the airframe of the rotorcraft at a second frequency. Such elastomers and mounts have numerous technical advantages including, e.g., reducing the cost and weight of the solution by reducing the noise at its source (i.e., before it is transmitted to the airframe). In addition, the elastomers are "tuned" to avoid amplifying the N-per-rev frequency, as is described in further detail later in this disclosure.

Example embodiments that may be used to implement a noise attenuating elastomer and/or mount are described below with more particular reference to the remaining Figures.

Each of FIGS. 5, 6, 7, and 8 illustrate a plurality of mounts coupling the components (i.e., the APU 302, the engine 304, the AGB 402, and the ECU 404) of FIG. 3 or 4 to an airframe of the rotorcraft 101. In each of the FIGS. 5, 6, 7, and 8, the component is illustrated as either transparent (e.g., dashed lines, where appropriate) or is not shown (e.g., due to the complex shape of the component potentially complicating the figure and obfuscating the mounts) in order to clearly depict an exemplary relationship between the component and the mounts.

Figure 5:
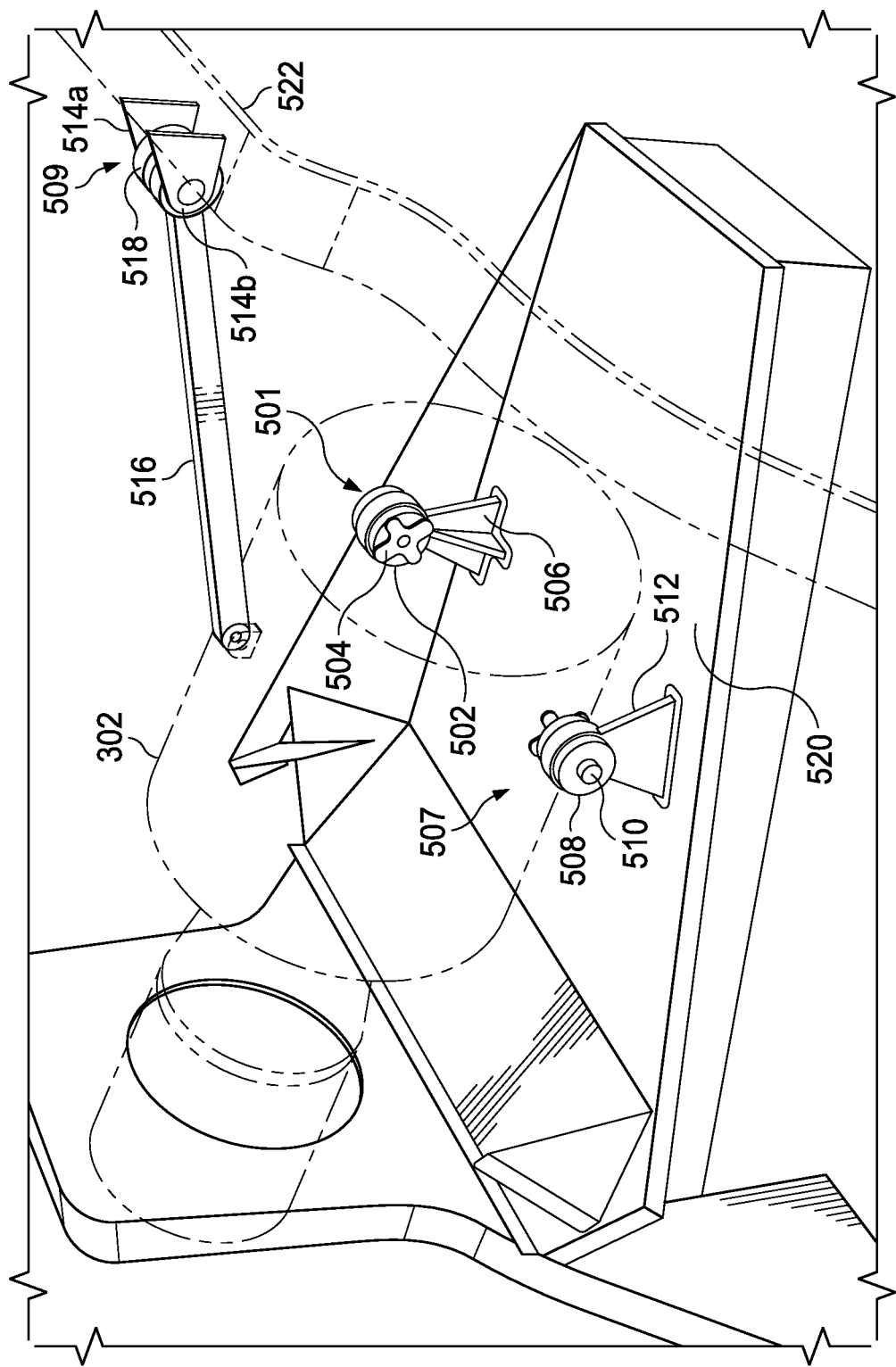
FIGS. 5, 6, 7, and 8 illustrate aircraft components supported by exemplary noise reducing mounts in accordance with certain embodiments.

Turning to FIG. 5, FIG. 5 illustrates a plurality of mounts coupling the auxiliary power unit (APU) 302 of FIG. 3 to a portion 520 of the airframe of the rotorcraft 101. A bottom of the APU 302 is supported by mounts 501 and 507 and a top of the APU 302 is supported by a mount 509.

The mount 501 comprises a bracket 504, an elastomer 502, and a structural support member 506. The mount 507 comprises a bracket 510, an elastomer 508, and a structural support member 512. Each of the brackets 504 and 510 is connected to the APU 302 and extends through an opening in the corresponding elastomer 502 and 508, respectively. The structural support members 506 and 512 wrap around the elastomers and carry a portion of the weight of the APU 302 down to the portion 520 of the airframe. The mount 507 is described in further detail with respect to FIGS. 9A and 9B, which illustrate an elevation view and a section through the mount 507, respectively. The mounts 501 and 507 are mirrors of one another, thus, the details described with respect to the mount 507 are applicable to the mount 501.

One end of the mount 509 is coupled to a portion 522 of the airframe of the rotorcraft 101 by a structural support member 514; another end of the mount 509 is coupled to the APU 302 by flanges extending from the top of the APU 302. The mount 509 comprises a bracket 516, an elastomer 518, and the structural support member 514. The bracket 516 couples to the flanges on the APU 302, on one end, and wraps around the elastomer 518 on the opposite end. The structural support member 514 comprises a shaft that couples the flanges 514a and 514b to the portion 522 of the airframe. The shaft nests within the elastomer 518. Because the bracket 516 wraps the elastomer 518 and the elastomer 518 wraps the shaft, the elastomer 518 is located between the bracket 516 and the shaft and, thereby, isolates vibrations from the APU 302 from reaching the portion 522 of the airframe. The mount 509 is described in further detail with respect to FIG. 10, which illustrates a section through the mount 509.

Figure 6:
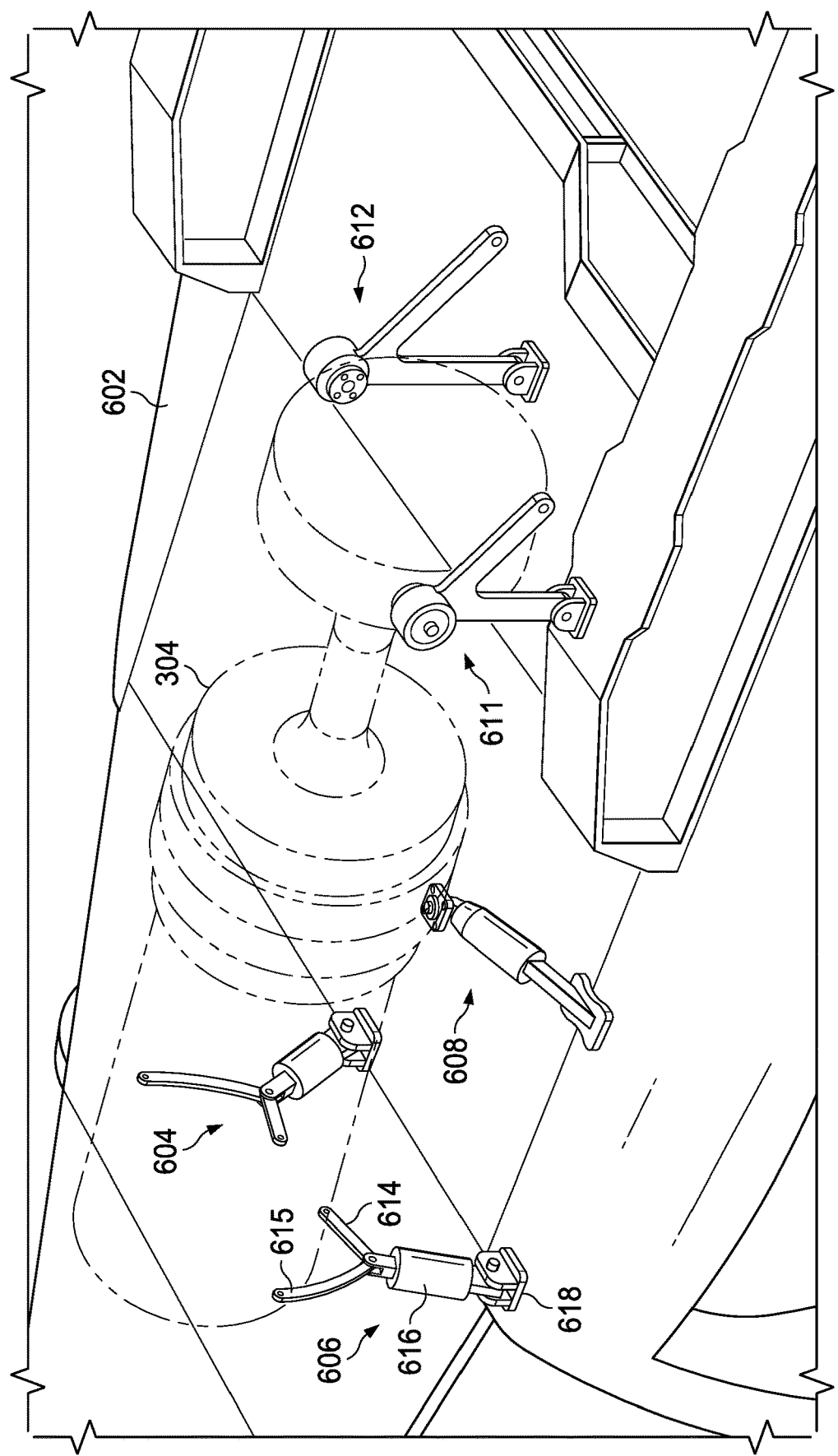

Turning to FIG. 6, FIG. 6 illustrates a plurality of mounts coupling the engine 304 of FIG. 3 to a portion 602 of the airframe of the rotorcraft 101. Mounts 604 and 606 support one end of the engine 304 and mounts 611 and 612 support an opposite end of the engine 304. Mount 608 supports a medial portion of the engine 304. Each of the mounts 604 and 606 includes two arms that extend out to support the engine 304 and include an elastomer that damps vibrations from the engine 304 from reaching the portion 602 of the airframe. The mount 606 comprises a cylindrical shell 616, arms 614 and 615, and pivotal attachment 618. The cylindrical shell 616 houses an elastomer (which is hidden in this view). The arms 614 and 615 support a portion of the weight of the engine 304 and transfer the weight to the cylindrical shell 616 via the elastomer. The pivotal attachment 618 connects the mount 606 to the portion 602 of the airframe. The elastomer is located between the cylindrical shell 616 and the arms 614 and 615 and, thereby, isolates vibrations from the engine 304 from reaching the portion 602 of the airframe. The mount 606 is described in further detail with respect to FIG. 11, which illustrates a section through the mount 606. The mounts 604 and 608 and comprise components similar to those described with respect to mounts 606 and are not repeated here only for brevity. Some differences include that the mount 608 is attached to the engine 304 at a single point of contact while each of the mounts 604 and 606 is attached to the engine 304 by multiple points of contact. Otherwise, the details described with respect to mount 606 are applicable to the mount 608. The mounts 604 and 606 are mirrors of one another, thus, the details described with respect to mount 606 are applicable to the mount 604. Each of the mounts 611 and 612 is coupled to the engine by a bracket that rests within a donut-shaped elastomer, which isolates vibrations from the engine 304 from reaching the portion 602 of the airframe. The mount 611 is described in further detail with respect to FIGS. 12A and 12B, which illustrate an elevation view and a section through the mount 611. The mounts 611 and 612 are substantially similar to one another, thus, the details described with respect to mount 611 are applicable to the mount 612.

Figure 7:
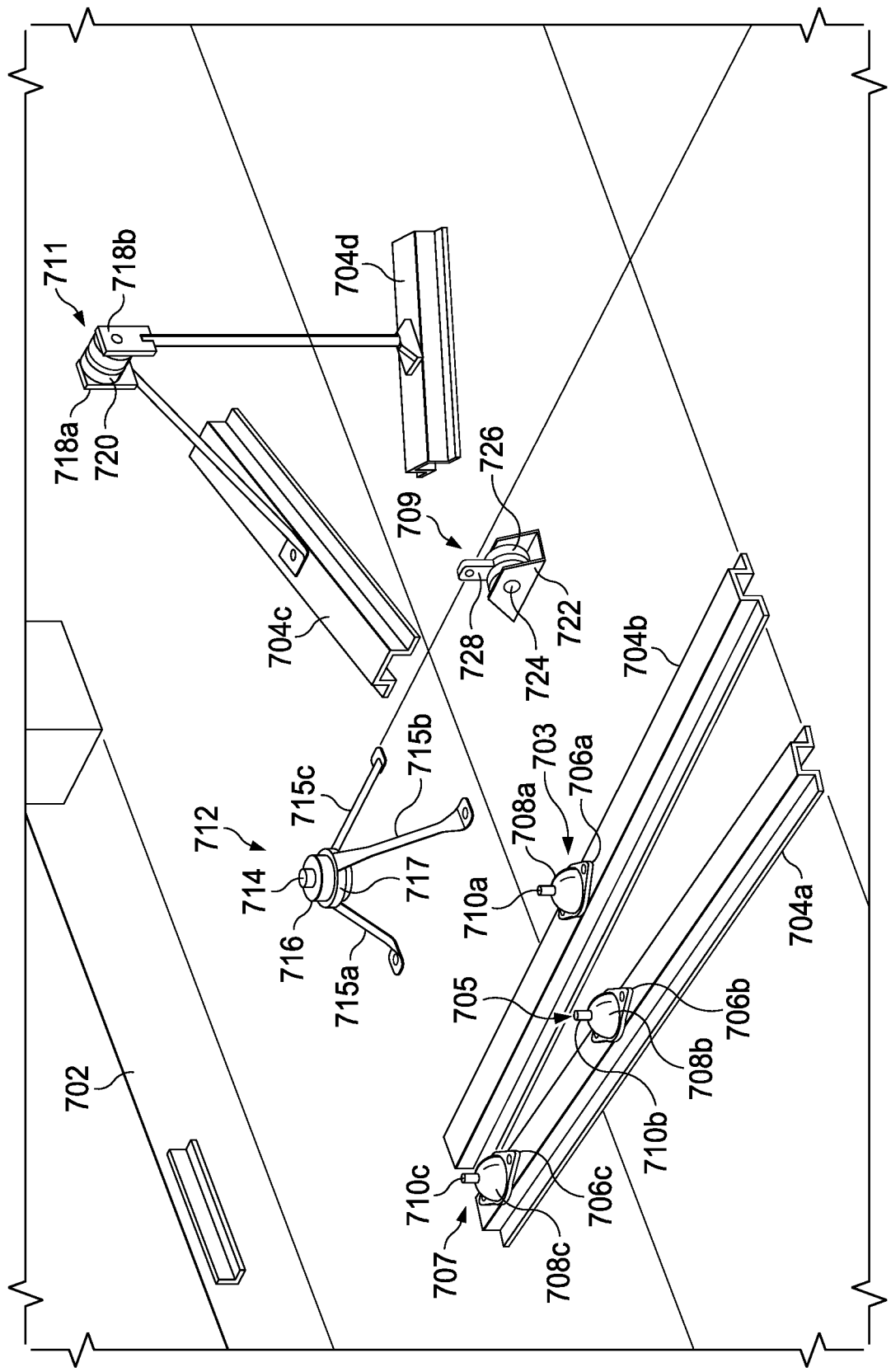

Turning to FIG. 7, FIG. 7 illustrates a plurality of mounts configured to couple the environmental control unit (ECU) 404 of FIG. 4 to a portion 702 of the airframe of the rotorcraft 101. The ECU 404 is not shown in FIG. 7 to prevent its complex shape from potentially complicating the figure and obfuscating the mounts. The mounts include dome mounts 703, 705, and 707, tripod mount 712, monopod mount 709, and bipod mount 711.

Each of the dome mounts 703, 705, and 707 include an elastomer (i.e., 708a, 708b, and 708c, respectively) and a plate (i.e., 706a, 706b, and 706c, respectively). Each of the elastomers is a hemispherical shell in shape. Each of the plates couple the elastomer a track (i.e., 704a or 704b) that is secured to the portion 702 of the airframe. In addition, each mount includes a shaft (i.e., 710a, 701b, and 710c) that extends through an opening in the elastomer. Each shaft is for coupling the mount to the ECU 404; the shaft transfers the weight of the ECU 404 to the portion 702 of the airframe via the elastomers (i.e., 708a, 708b, and 708c). The elastomers are located between the shafts (i.e., 710a, 701b, and 710c) and the plates and, thereby, isolate vibrations from the ECU 404 from reaching the portion 702 of the airframe. The mount 707 is described in further detail with respect to FIG. 13, which illustrates a section through the mount 707. The mounts 703 and 705 are identical to the mount 707 and, thus, the details described with respect to mount 707 are applicable to the mounts 703 and 705.

The tripod mount 712 comprises a structural support member, an elastomer 716, and a shaft 714. The structural support member is a tripod comprising a plate 717 and struts 715a, 715b, and 715c. The struts support the plate 717. The plate 717 is disc-shaped rigid member and includes an opening into which the elastomer 716 nests. The elastomer 716 is generally cylindrical in shape and comprises an opening into which the shaft 712 nests. The elastomer 716 is located between the shaft 714 and the plate 717 and, thereby, isolate vibrations from the ECU 404 from reaching the portion 702 of the airframe. The mount 712 is described in further detail with respect to FIG. 14, which illustrates a section through the mount 712.

The bipod mount 711 comprises a structural support member, an elastomer 720 and a shaft (which is substantially hidden in the view of FIG. 7). The structural support member is a bipod comprising struts 718a and 718b. Each strut includes a plate-like portion, which has an opening through which the shaft extends. The shaft spans between the struts 718a and 718b. The elastomer 720 wraps around the shaft. A bracket may wrap around the elastomer 720 to couple the ECU 404 to the structural support member. The elastomer 720 is located between the shaft and the ECU 404 and, thereby, isolate vibrations from the ECU 404 from reaching the portion 702 of the airframe. The mount 711 is described in further detail with respect to FIG. 15, which illustrates a section through the mount 711.

The monopod mount 709 comprises a structural support member, elastomer 726, and bracket 728. The structural support member is a pivotal attachment comprising a plate 722 and a shaft 724. The shaft 724 spans between flanges of the plate 722. The elastomer 726 wraps around the shaft 724. The bracket 728 wraps around the elastomer 726 and transfers the weight of the ECU 404 to the shaft 724. In addition, the bracket 728 includes a hole through which a shaft can extend and couple the bracket to the ECU 404. The mount 709 is similar in cross section to the mount 509, which is described in further detail with respect to FIG. 10. Thus, the details described with respect to mount 509 are applicable to the mount 709.

Figure 8:
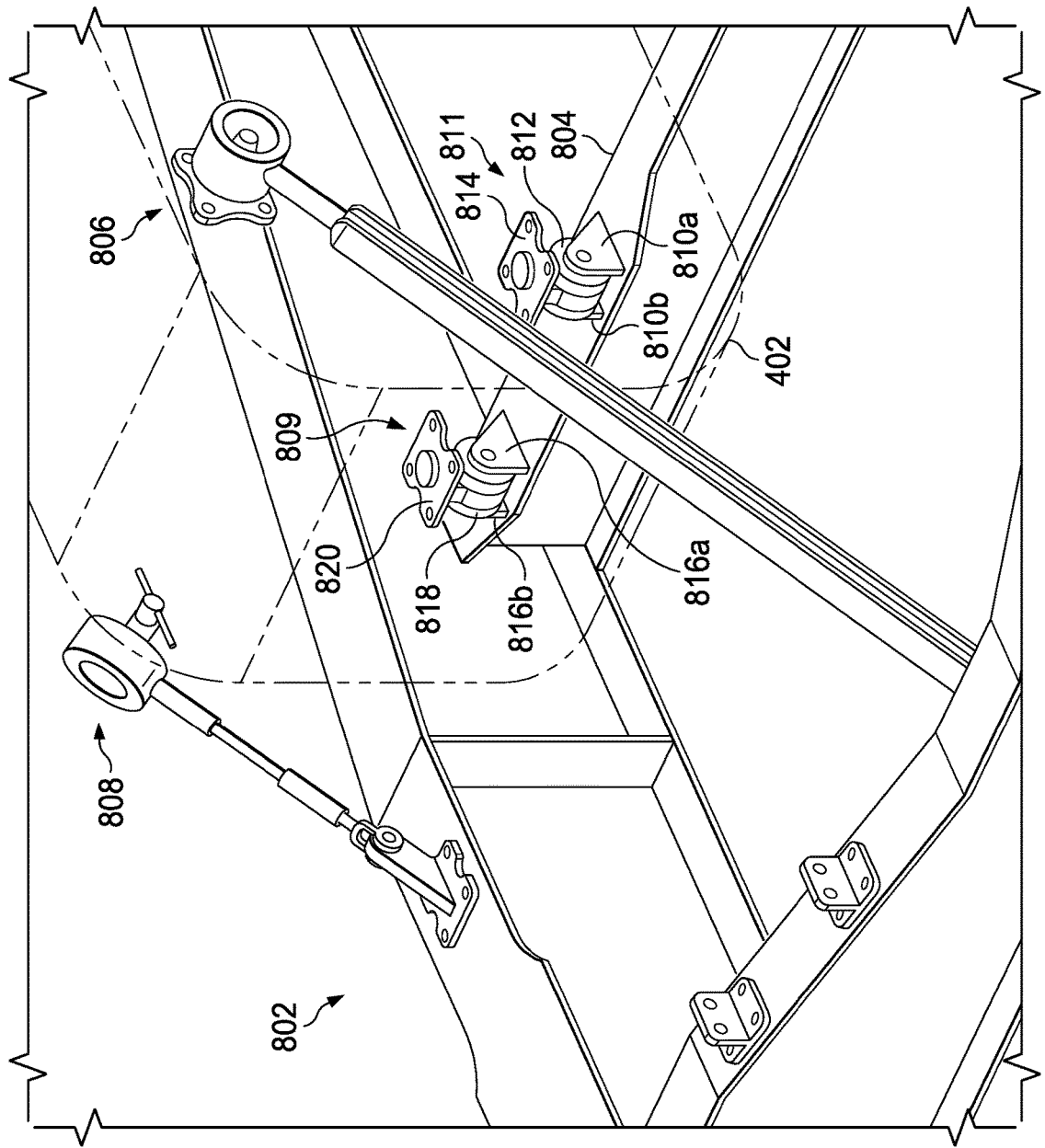

Turning to FIG. 8, FIG. 8 illustrates a plurality of mounts coupling the accessory gear box (AGB) 402 of FIG. 4 to a portion 802 of the airframe of the rotorcraft 101. The portion 802 of the airframe includes a beam 804, among other structural components. Mounts 806 and 808 support a top of the AGB 402 and mounts 809 and 811 support a bottom of the AGB 402. The mounts 806 and 808 are similar to the mount 611, which is described in further detail with respect to FIGS. 12A and 12B. One difference between the mounts 806 and 808 and the mount 611 is that the mounts 806 and 808 have only one strut (as opposed to two strut portions of the mount 611). However, a head of the mounts 806 and 808 (e.g., a bracket which houses an elastomer) is similar in general shape and operation to that in the mount 611. The mounts 809 and 811 support a vast majority of the weight of the AGB 402 and the mounts 806 and 808 prevent lateral movement (e.g., tilting, rocking, and the like) of the AGB 402. The beam 804 includes plates 810a, 810b, 816a, and 816b, which support the mounts 809 and 811. The mount 811 comprises a bracket 814, elastomer 812, and a pivotal shaft that extends between plates 810a and 810b. The mount 809 comprises a bracket 820, elastomer 818, and a pivotal shaft that extends between the plates 816a and 816b. Each bracket couples to and supports the weight of the AGB 402. In addition, each bracket wraps around the elastomer. In turn, the elastomer wraps around the shaft. The elastomers are located between the brackets and the shafts and, thereby, isolate vibrations from the AGB 402 from reaching the beam 804 of the airframe. The mount 811 is described in further detail with respect to FIG. 16, which illustrates a section through the mount 811. The mounts 809 and 811 are identical to one another and, thus, the details described with respect to mount 811 are applicable to the mount 809.

Figure 10:
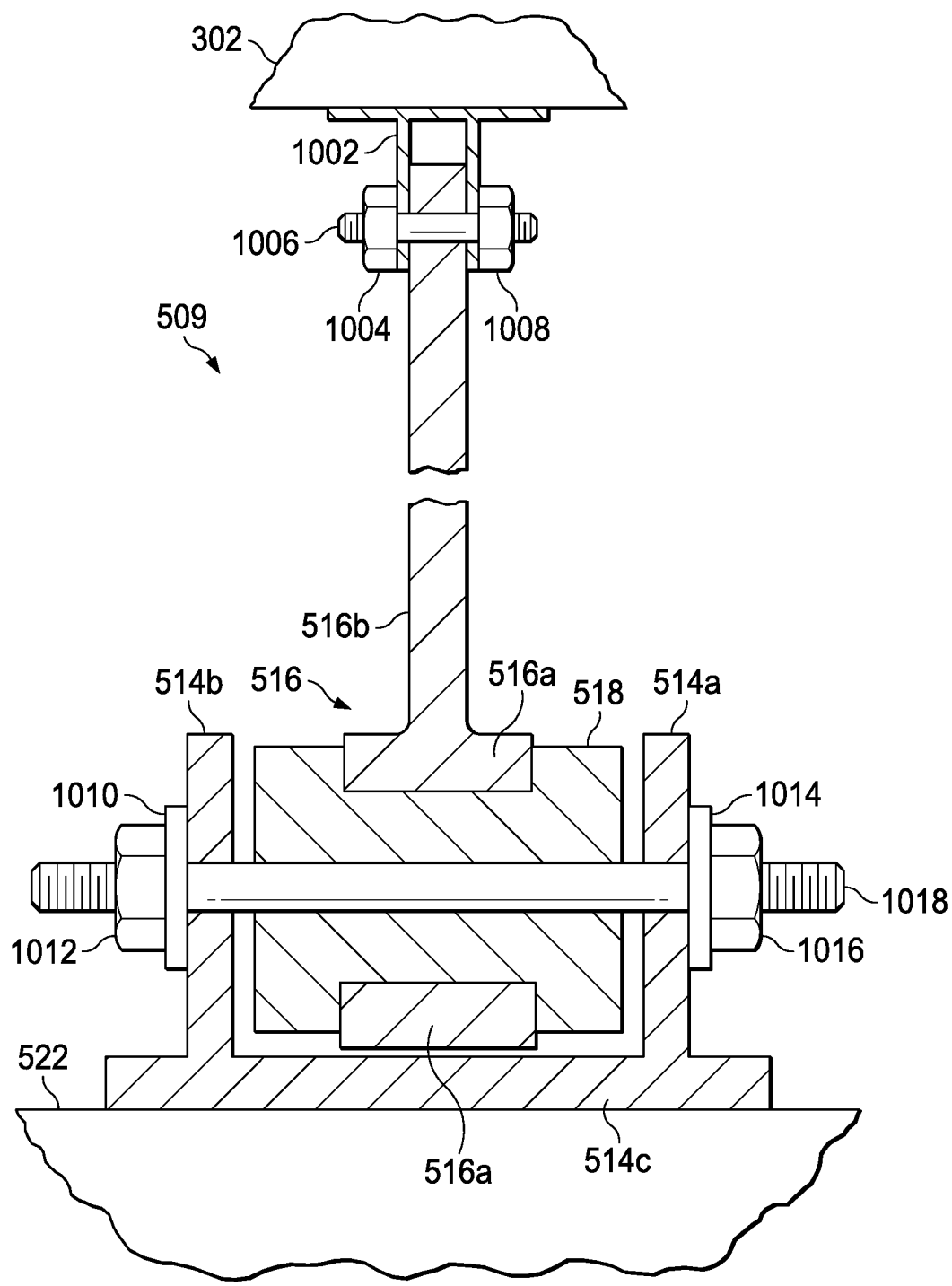
Figure 11:
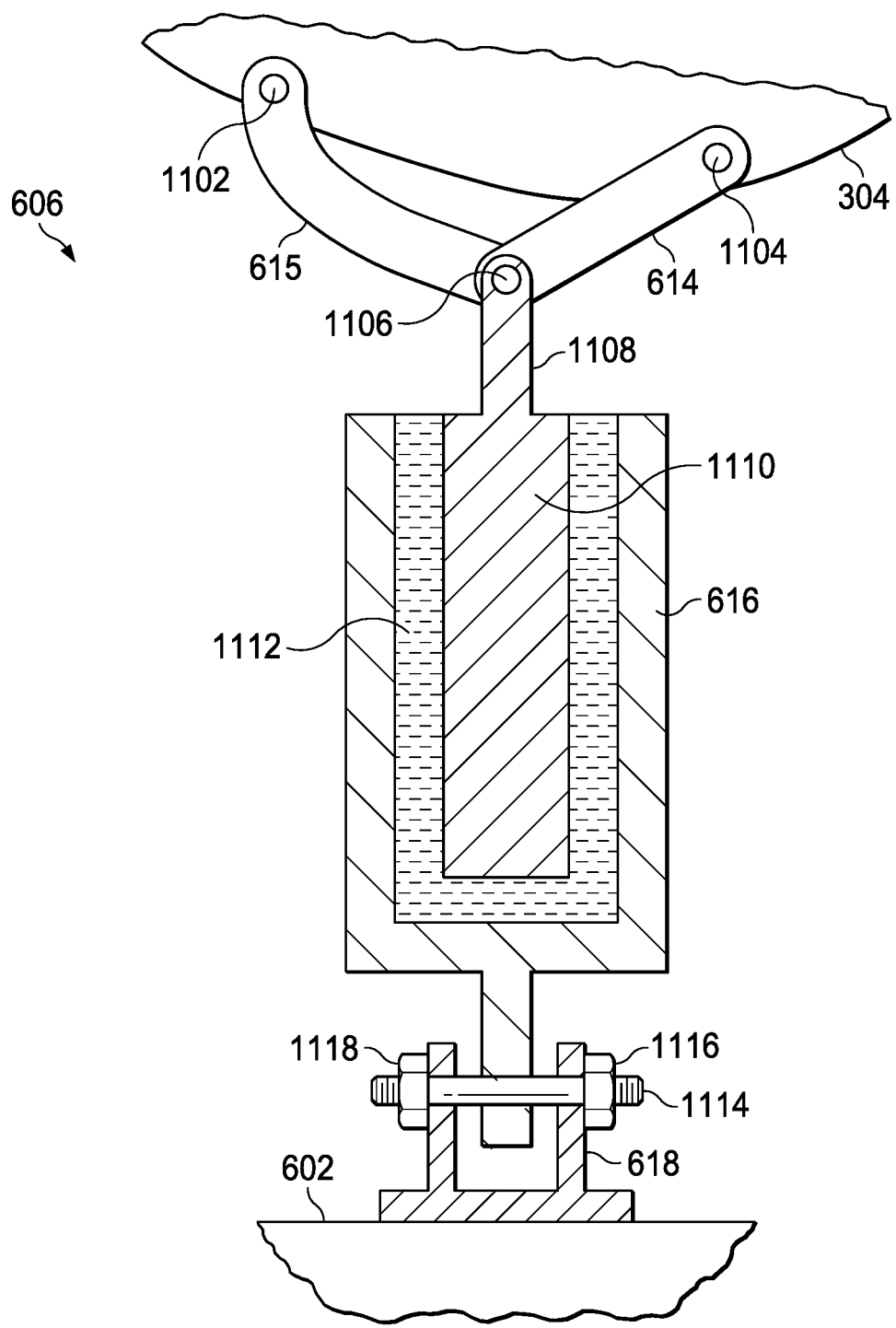
Figure 12:
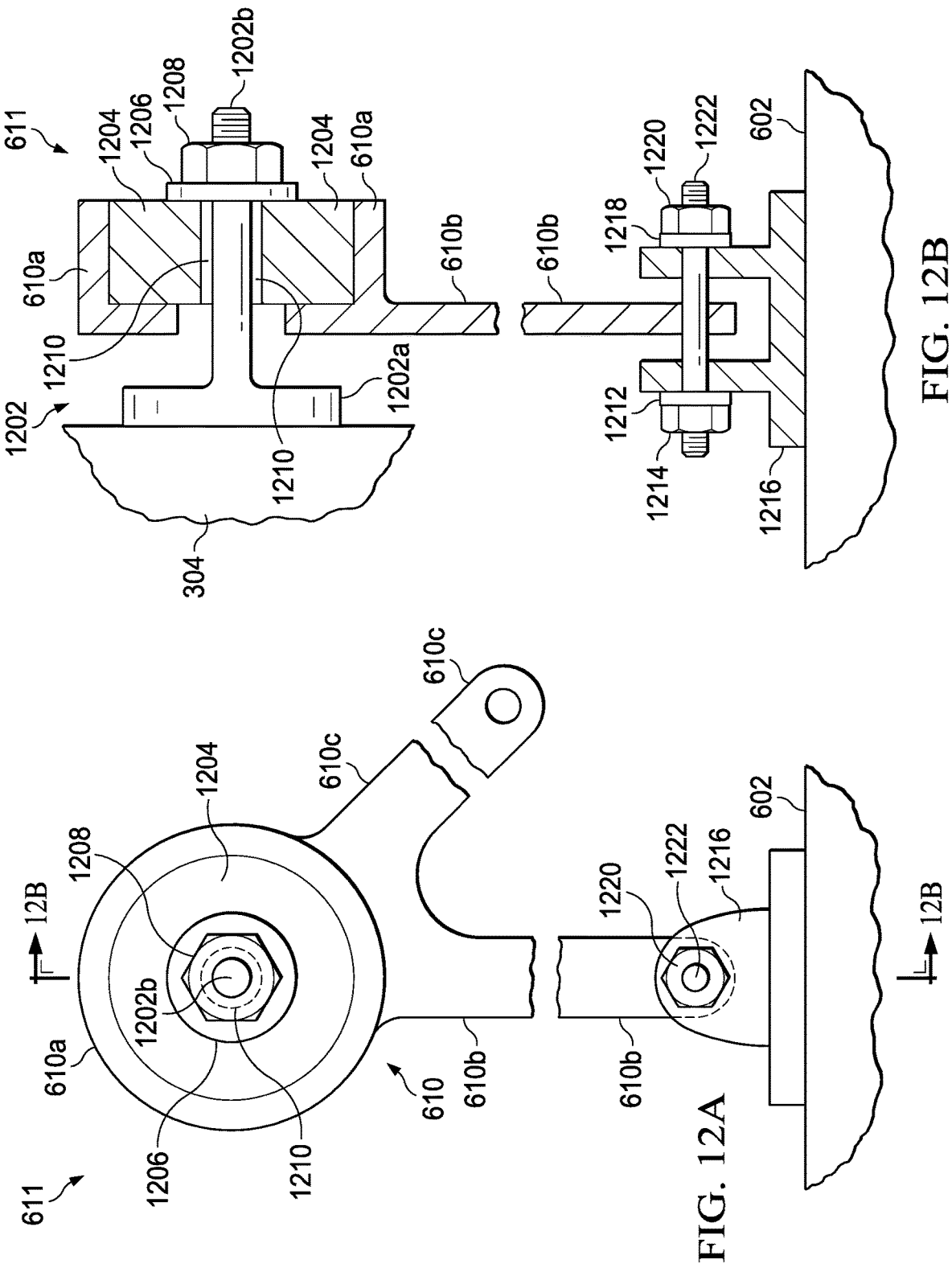
Figure 13:
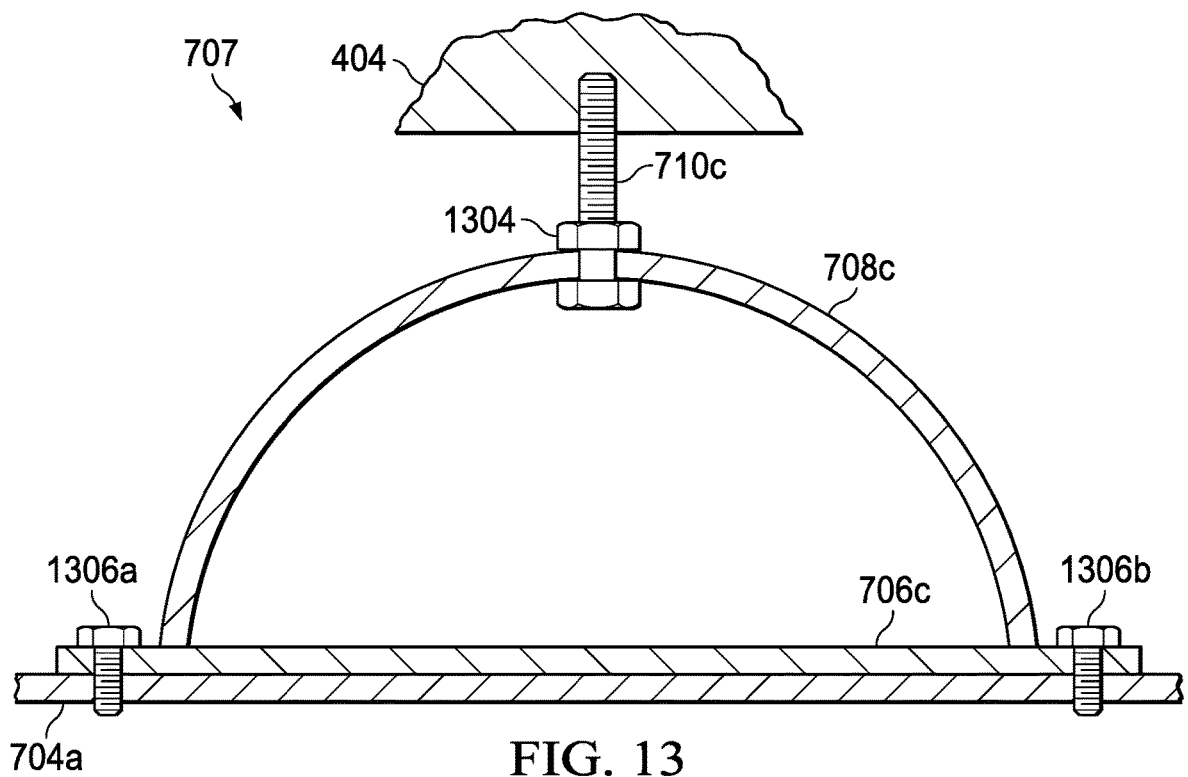
Figure 14:
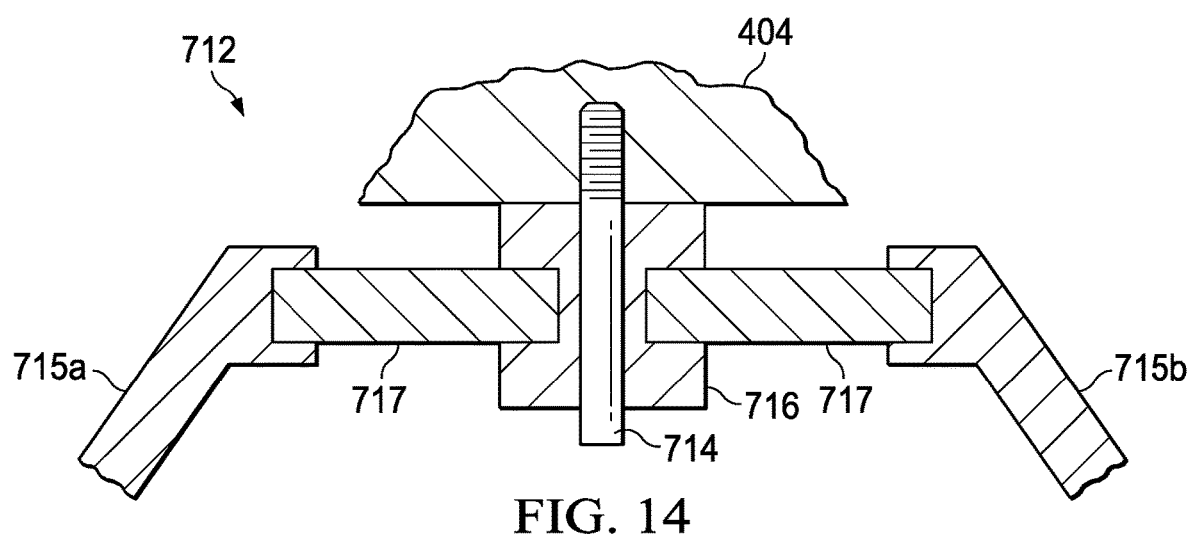
Figure 15:
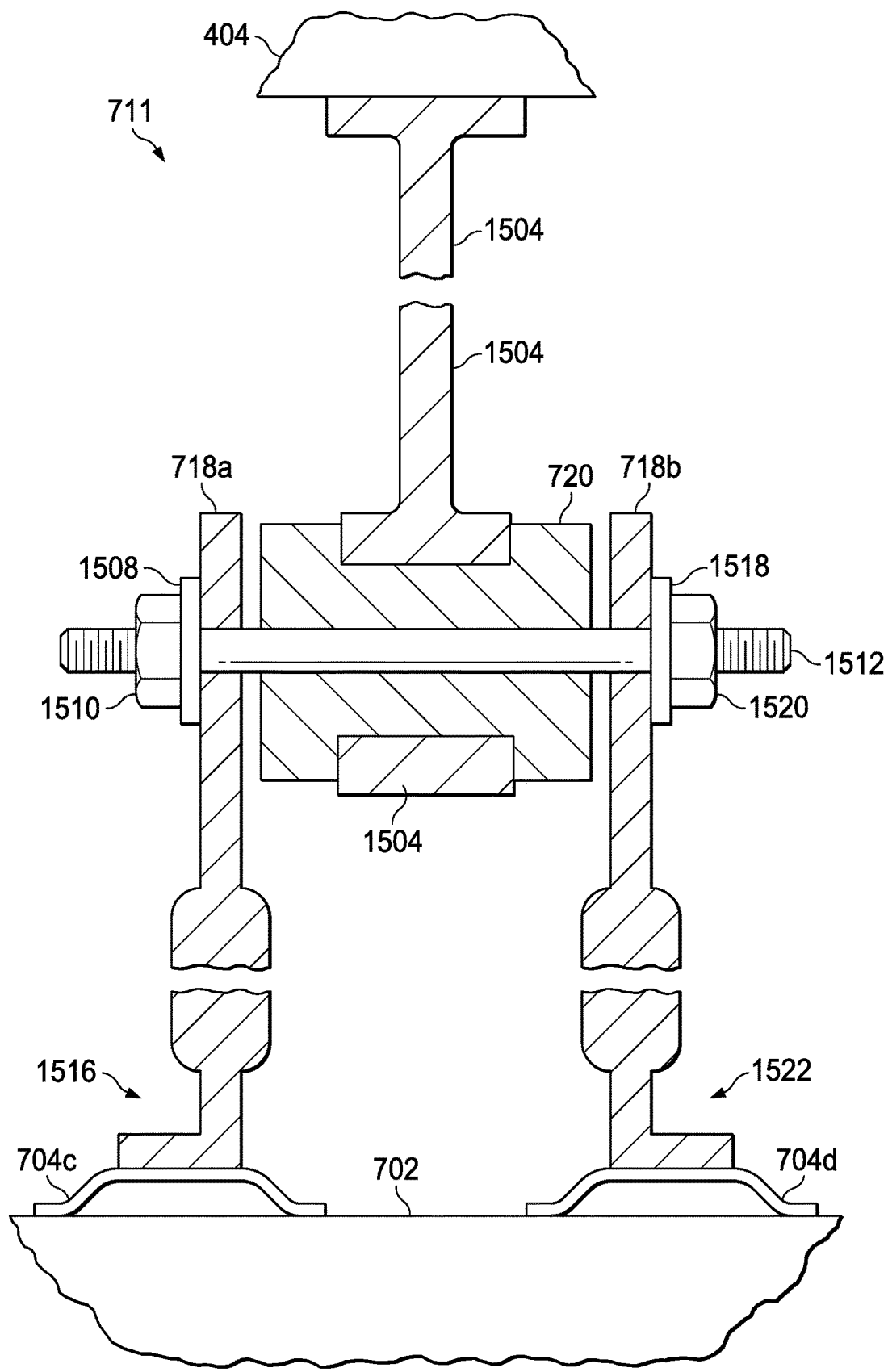
Figure 16:
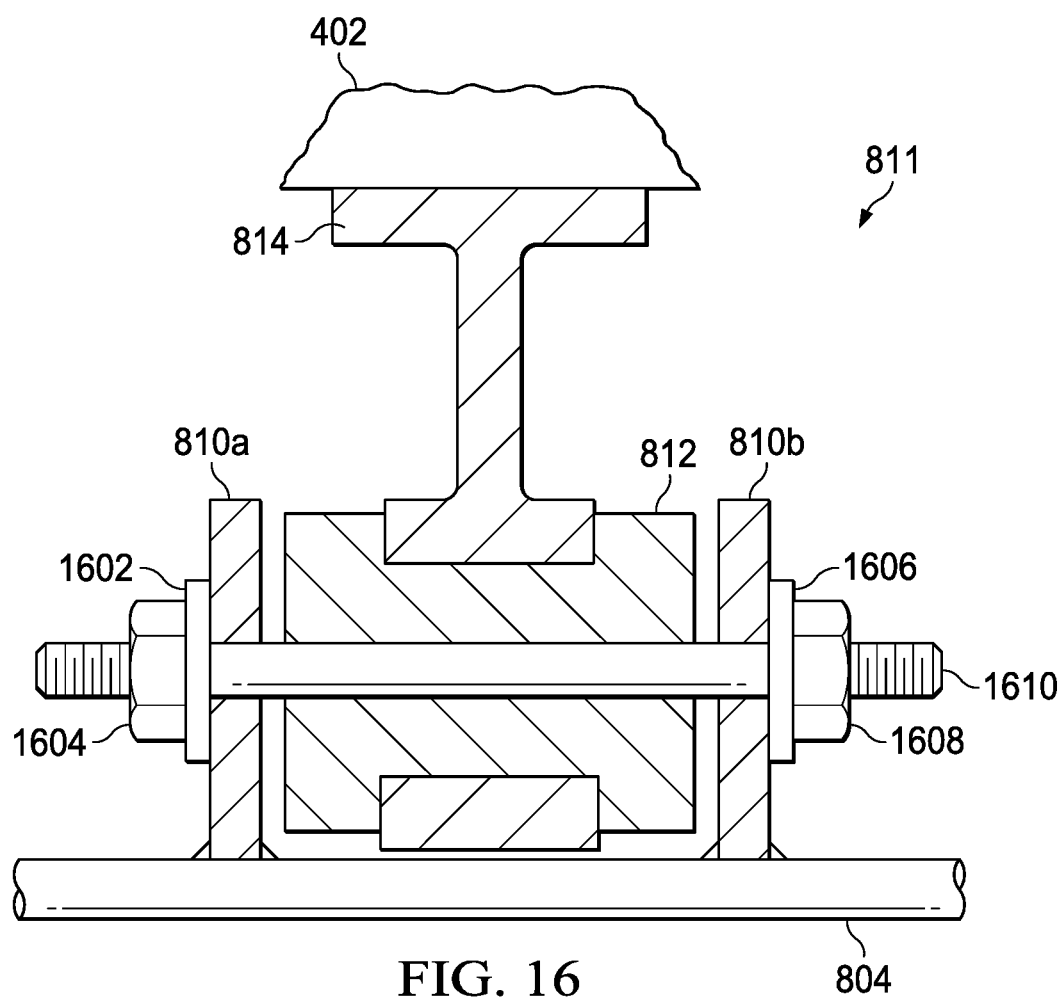

FIGS. 9A, 9B, 10, 11, 12A, 12B, 13, 14 are cross sectional view of the mounts of FIGS. 5, 6, 7, and 8. FIGS. 9A, 9B, and 10 illustrate details of the mounts of FIG. 5 that couple the APU 302 to the airframe of the rotorcraft 101. FIGS. 11, 12A, and 12B, illustrate details of the mounts of FIG. 6 that couple the engine 304 to the airframe of the rotorcraft 101. FIGS. 13, 14, and 15 illustrate details of the mounts of that couple the ECU 404 to the airframe of the rotorcraft 101. FIG. 16 illustrate details of some of the mounts of FIG. 8 that couple the AGB 402 to the airframe of the rotorcraft 101.

Turning to FIGS. 9A and 9B, FIG. 9A is an elevation view of the mount 507; FIG. 9B is a partial section view of the mount 507. The mount 507 attaches the APU 302 to the portion 520 of the airframe of the rotorcraft 101. The mount 507 comprises a bracket 510, an elastomer 508, and a structural support member 512. The bracket 510 is attached to the APU 302 by a rigid attachment (e.g. welding, mechanical fasteners, and the like). The structural support member 512 is attached to the portion 520 of the airframe of the rotorcraft 101 by a rigid attachment. Releasable attachments 906a and 906b enable an upper portion of the support member 512 (e.g., a portion above the releasable attachments 906a and 906b) and a lower portion of the support member 512 (e.g., a portion below the releasable attachments 906a and 906b) to be detached from one another. In operation, the elastomer 508 may be inserted into or removed from the support member 512 based on the releasable attachments 906a and 906b being engaged with one another or detached from one another, respectively. The elastomer 508 is located between the structural support member 512 and the bracket 510. The elastomer 508 is generally cylindrical in shape and has a circumferential recession on an outer wall of the elastomer into which the structural support member 512 fits. The elastomer 508 comprises an opening extending through its length into which the bracket 510 fits. The bracket 510 comprises a plate portion and a shaft portion. The shaft portion of the bracket 510 extends through the opening in the elastomer 508. A nut 904 a washer 902 secure the shaft portion of the bracket 510 to the elastomer 508. The structural support member 512 comprises a ring-shaped portion, which wraps around the elastomer 508 and nests into the recession around the elastomer 508. The structural support member 512 receives a weight of the APU 302 by way of the elastomer 508 and transfers the weight to the airframe of the rotorcraft.

In operation, the APU 302 produces vibrations at a frequency. Thus, the bracket 510, which is attached to the APU 302, also vibrates at the frequency. Simultaneously, a rotor system of the rotorcraft 101 vibrates the portion 520 of airframe of the rotorcraft 101 at N-per-rev. Thus, the structural support member 512, which is attached to the portion 520 of airframe, may also vibrate at the N-per-rev. Advantageously, the elastomer 508 attenuates noise caused by the APU's vibrations (i.e., at the frequency) by isolating such vibrations from reaching the portion 520 of airframe of the rotorcraft 101 while the portion 520 may be simultaneously vibrating at the N-per-rev.

Turning to FIG. 10, FIG. 10 is a section view of the mount 509. The mount 509 attaches the APU 302 to a portion 522 of the airframe of the rotorcraft 101. The mount 509 comprises a bracket 516, an elastomer 518, and a structural support member.

The bracket 516 is attached to the APU 302 by a pivotal attachment 1002, which allows the bracket 516 and the APU 302 to pivot with respect to one another. The bracket 516 comprises a strut portion 516b and a ring portion 516a. The ring portion 516a of the bracket 516 comprises an opening in which the elastomer 518 nests. The strut portion 516b of the bracket 516 comprising an opening through which the bracket 516 is attached to the APU 302 by the pivotal attachment 1002. Nuts 1004 and 1008 secure a shaft 1006 couple the strut portion 516b of the bracket 516 to the pivotal attachment 1002. The pivotal attachment 1002 is attached to the APU 302 by a rigid attachment (e.g. welding; mechanical fasteners such as screw, bolts, rivets; and the like).

The structural support member comprises flanges 514a and 514b, web 514c, and shaft 1018. The flanges 514a and 514b extend from the web 514c. The shaft 1018 extends through an opening in each of the flanges 514a and 514b. The web 514c is affixed to the portion 522 of the airframe by a rigid attachment. Nuts 1012 and 1016 and washers 1010 and 1014 secure the shaft 1018 to the flanges 514a and 514b. The bracket 516 and elastomer 518 wrap around the shaft 1010 between the flanges of the structural support member. The structural support member is also a pivotal attachment. Thus, the bracket 516 and the elastomer 518 can pivot about the shaft 1018. The structural support member 514 receives a weight of the APU 302 by way of the elastomer 518 and transfers the weight to portion 522 of the airframe of the rotorcraft.

The elastomer 518 is located between the structural support member and the bracket 516. The elastomer 518 is generally cylindrical in shape and has a circumferential recession on an outer wall of the elastomer into which the ring portion 516a of the bracket 516 fits. The elastomer 508 comprises an opening extending through its length into which the shaft 1018 fits.

In operation, the APU 302 produces vibrations at a frequency while, simultaneously, the rotor system of the rotorcraft 101 vibrates the portion 522 of airframe of the rotorcraft 101 at N-per-rev. Thus, the bracket 516, which is attached to the APU 302, also vibrates at the frequency; the structural support member, which is attached to the portion 522 of airframe, vibrates at N-per-rev. Advantageously, elastomer 518 attenuates noise caused by the APU's vibrations (i.e., at the frequency) by isolating such vibrations from reaching the portion 522 of airframe of the rotorcraft 101 while the portion 520 may be simultaneously vibrating at the N-per-rev.

Turning to FIG. 11, FIG. 11 is a section view of the mount 606. The mount 606 attaches the engine 304 to a portion 602 of the airframe of the rotorcraft 101. The mount 606 comprises a bracket, a structural support member 616, an elastomer 1112, and a pivotal attachment 618. The bracket comprises arms 614 and 615, a strut 1108, and a cylinder 1110. The arms 614 and 615 are coupled to the engine 304 by pivotal joints 1104 and 1102, respectively. The arms 614 and 615 and the strut 1108 are connected by a pivotal joint 1106, which allows the arms to pivot about the joint 1106. The cylinder 1110 is continuous with the strut 1108. The cylinder 1110 bears down on the elastomer 1112 to transfer a portion of the weight of the engine 304 to the structural support member 616. The structural support member 616 comprises a cylindrical shell, which houses the elastomer 1112 and the cylinder 1110. The strut 1108 extends through an opening in a top of the cylindrical shell. The elastomer 1112 is a cylinder shell in shape and fits within the cylindrical shell of the structural support member 616. The cylindrical shell (of the structural support member 616) includes a strut extending from its bottom. The strut extending from the bottom of the cylindrical shell 616 includes an opening for coupling to the pivotal attachment 618. The pivotal attachment 618 couples the mount 606 to the portion 602 of the airframe. A shaft 1114 spans between flanges of the pivotal attachment 618. Nuts 1116 and 1118 secure the shaft 1114 to the pivotal attachment 618. The structural support member 616 can pivot about the shaft 1114.

The elastomer 1112 is located between the cylinder 1110 of the bracket and the cylindrical shell of the structural support member 616 and, thereby, isolates vibrations from the engine 304 from reaching the portion 602 of the airframe. In operation, the engine 304 produces vibrations at a frequency while, simultaneously, the rotor system of the rotorcraft 101 vibrates the portion 602 of airframe of the rotorcraft 101 at N-per-rev. Thus, the bracket (e.g., arms 614 and 615, the strut 1108, and the cylinder 1110), which is attached to the engine 304, also vibrates at the frequency; the structural support member 616, which is attached to the portion 602 of airframe, vibrates at N-per-rev. Advantageously, the elastomer 1112 attenuates noise caused by the engine's vibrations (i.e., at the frequency) by isolating such vibrations from reaching the portion 602 of airframe of the rotorcraft 101 while the portion 602 may be simultaneously vibrating at the N-per-rev.

Turning to FIGS. 12A and 12B, FIG. 12A is an elevation view of the mount 611; FIG. 12B is a section view of the mount 611. The mount 611 attaches the engine 304 to a portion 602 of the airframe of the rotorcraft 101. The mount 611 comprises a bracket 1202, an elastomer 1204, and a structural support member 610.

The bracket 1202 comprises a plate portion 1202a and a shaft portion 1202b. The plate portion 1202a and the shaft portion 1202b are continuous with one another. The shaft portion 1202b extends through an opening in the elastomer 1204. A bushing 1210 is a cylindrical sleeve that wraps the shaft portion 1202b and serves as a bearing between the elastomer 1204 and the shaft portion 1202b. Nut 1208 and washer 1206 secure the bracket 1202 to the elastomer 1204 and the structural support member 610. The plate portion 1202a of the bracket 1202 is attached to the engine 304 by a rigid attachment (e.g. welding, mechanical fasteners, and the like).

The structural support member 610 comprises a ring-shaped portion 610a and strut portion 610b. The ring-shaped portion 610a includes a cavity in which the elastomer 1204 nests. In other words, the ring-shaped portion 610a of the structural support member 610 wraps around the elastomer 1204. The structural support member 610 receives a weight of the engine 304 by way of the elastomer 1204 and transfers the weight to the portion 602 of the airframe of the rotorcraft 101. The structural support member 610 is attached to the portion 602 of the airframe of the rotorcraft 101 by a pivotal attachment.

The pivotal attachment comprises plate 1216 and shaft 1222. The plate 1216 is attached to the portion 602 of the airframe of the rotorcraft 101 by a rigid attachment (e.g. welding, mechanical fasteners, and the like). Nuts 1220 and 1214 and washers 1218 and 1212 secure the shaft 1222 to the plate 1216. The shaft 1222 extends through openings in flanges of the plate 1216. The structural support member 610 can pivot about the shaft 1222.

The elastomer 1204 is located between the structural support member 610 and the bracket 1202. The elastomer 1204 is generally ring shaped (e.g., similar to donut with a rectangular cross-section). The elastomer 1204 comprises an opening in which the shaft portion 1202b nests.

As discussed above, the engine 304 may vibrate during operation. The elastomer 1204 is located between the bracket 1202 and the structural support member 610 and, thereby, isolate vibrations from the engine 304 from reaching the portion 602 of the airframe. Advantageously, the elastomer 1204 attenuates noise caused by the engine's vibrations by isolating such vibrations from reaching the airframe of the rotorcraft 101 while the airframe may be simultaneously vibrating at the N-per-rev.

Turning to FIG. 13, FIG. 13 is a section view of the dome mount 707. The dome mount 707 includes an elastomer 708c, a plate 706c, and a bolt 710c. The elastomer 708c is a hemispherical shell (e.g., a dome) in shape and is affixed to the plate 706c. The plate 706c couples the elastomer 708c to a track 704a. The track 704a is secured to a portion of the airframe of the rotorcraft 101. In addition, the elastomer includes an opening through which the bolt 710c extends. The bolt 710c is secured to the elastomer 706c by a nut 1304 and couples ECU 404 to the elastomer 708c. The nut 304 and the head of the bolt are on opposite sides of the elastomer and clasp the elastomer 708c. The elastomer 708c is located between the bolt 710c and the plate 706c and, thereby, isolates vibrations from the ECU 404 from reaching the airframe.

In operation, the ECU 404 produces vibrations at a frequency while, simultaneously, the rotor system of the rotorcraft 101 vibrates the portion of airframe of the rotorcraft 101 at N-per-rev. Thus, the bolt 710c, which is attached to the ECU 404, also vibrates at the frequency and the plate 706c, which is attached to the airframe by the track 704a, vibrates at N-per-rev. Any weight and/or vibrations (e.g., from the weight of the ECU 404) transferred to the bolt 710c causes the elastomer to deflect, e.g., in a direction toward/away from the plate 706c. Advantageously, the elastomer 708c attenuates noise caused by the ECU's vibrations (i.e., at the frequency) by isolating such vibrations from reaching the airframe of the rotorcraft 101 while the airframe may be simultaneously vibrating at the N-per-rev.

Turning to FIG. 14, FIG. 14 is a section view of the tripod mount 712. The tripod mount 712 comprises a structural support member, an elastomer 716, and a shaft 714. The structural support member is a tripod comprising a plate 717 and struts 715a, 715b, and 715c (715c is not visible in the view of FIG. 14). The struts support the plate 717. In addition, each of the struts is attached to the airframe of the rotorcraft 101. The plate 717 includes an opening into which the elastomer 716 nests.

The elastomer 716 is generally cylindrical in shape and has a circumferential recession on an outer wall of the elastomer into which the plate 717 fits. The elastomer 716 comprises an opening extending through its length into which the shaft 714 fits. The elastomer 716 is located between the shaft 714 and the plate 717 and, thereby, isolate vibrations from the ECU 404 from reaching the portion 702 of the airframe.

As discussed above, the ECU 404 may vibrate during operation. Such vibrations may be vertical, horizontal, or a combination of the two. Regardless of the direction of the vibrations, the elastomer 716 (of FIG. 14) can damp them before they reach the airframe. For example, vertical movement of the ECU 404 compresses the elastomer 716 between the surface of the ECU 404 and the top of the plate 717. Lateral vertical movement of the ECU 404 compresses the elastomer 716 between the shaft 714 and walls of the opening in the plate 717. The ECU 404 vibrate may at a frequency while, simultaneously, the rotor system of the rotorcraft 101 vibrates the portion of airframe of the rotorcraft 101 at N-per-rev. Thus, the shaft 714, which is attached to the ECU 404, also vibrates at the frequency; the struts (i.e., 715a, 715b, and 715c), which are attached to the airframe, vibrate at N-per-rev. Advantageously, the elastomer 716 attenuates noise caused by the ECU's vibrations (i.e., at the frequency) by isolating such vibrations from reaching the airframe of the rotorcraft 101 while the airframe may be simultaneously vibrating at the N-per-rev.

Turning to FIG. 15, FIG. 15 is a section view of the bipod mount 711. The bipod mount 711 comprises a structural support member, an elastomer 720, and a bracket 1504. The structural support member is a bipod comprising struts 718a and 718b. Each strut includes a plate at an upper portion, which includes an opening through which a shaft 1512 extends. The shaft 1512 spans between the struts 718a and 718b. Nuts 1510 and 1520 and washers 1508 and 1518 secure the shaft 1512 to the struts 718a and 718b. The struts 718a and 718b also includes a rod at a lower portion, and an angled base portion (i.e., 1516 and 1522, respectively). The angled base portions 1516 and 1522 are fastened to tracks 704c and 704d, respectively, by a rigid attachment. Each of the tracks 704c and 704d are coupled to the portion 702 of the airframe.

The bracket 1504 is similar to the bracket 516 (of FIG. 10) and, thus the bracket 1504 is not described in detail here only for the purpose of brevity. The details described with respect to the bracket 516 are applicable to the bracket 1504. The bracket 1504 is coupled to the ECU 404 by a rigid attachment. The bracket 1504 wraps around the elastomer 720 and the shaft 1512 and, thereby, couples the ECU 404 to the structural support member. The bracket 1504 can pivot about the shaft 1512.

The elastomer 720 wraps around the shaft 1512. The struts 718a and 718b sandwich the elastomer 720 and the bracket 1504 along the shaft 1512. The elastomer 720 is located between the shaft 1512 and the bracket 1504 and, thereby, isolate vibrations from the ECU 404 from reaching the portion 702 of the airframe. Advantageously, the elastomer 720 attenuates noise caused by the ECU's vibrations by isolating such vibrations from reaching the airframe of the rotorcraft 101 while the airframe may be simultaneously vibrating at the N-per-rev.

Turning to FIG. 16, FIG. 16 is a section view of the mount 811 (of FIG. 8). The mount 811 comprises a bracket 814, an elastomer 812, and a structural support member.

The structural support member comprises flanges 810a and 810b. Each of the flanges 810a and 810b are affixed to the beam 804 of the airframe by a rigid attachment. A shaft 1610 extends through an opening in each of the flanges 810a and 810b. Nuts 1604 and 1608 and washers 1602 and 1606 secure the shaft 1610 to the flanges 810a and 810b. The bracket 814 and the elastomer 812 wrap around the shaft 1610 between the flanges 810a and 810b of the structural support member. The structural support member is also a pivotal attachment. Thus, the bracket 814 and the elastomer 812 can pivot about the shaft 1610. The structural support member receives a weight of the AGB 402 by way of the elastomer 812 and transfers the beam 804.

The bracket 814 is similar to the bracket 516 (of FIG. 10) and, thus the bracket 814 is not described in detail here only for the purpose of brevity. The details described with respect to the bracket 516 are applicable to the bracket 814. The bracket 814 is coupled to the AGB 402 by a rigid attachment. The bracket 814 wraps around the elastomer 812 and the shaft 1610 and, thereby, couples the ECU 404 to the structural support member. The bracket 814 supports the weight of the AGB 402. In particular, the bracket 814 transfers the weight of the AGB 402 to the shaft 1610 via the elastomer 812.

The elastomer 812 is located between the bracket 814 and the shaft 1610 of the structural support member and, thereby, isolates vibrations from the AGB 402 from reaching the beam 804 of the airframe. The structural support member couples the bracket 814 and the elastomer 812 to a flange of the beam 804, which is part of the airframe of the rotorcraft 101. Advantageously, the elastomer 812 attenuates noise caused by the AGB's vibrations by isolating such vibrations from reaching the airframe of the rotorcraft 101 while the airframe may be simultaneously vibrating at the N-per-rev.

Several examples mount of the present disclosure include a bracket and a structural support member. In general, a bracket is inclusive of a rigid member that is configured to attach to a vibratory component (e.g., a portion of an aircraft system). A structural support member is inclusive of any rigid member to provide structural support for a component and to transfer its weight (and vibratory load) to an aircraft. Brackets and structural support members have a load-carrying capacity commensurate to loads imposed by the component for which they provide structural support. Such brackets and structural support members may be constructed of metal (e.g., steel, aluminum, an alloy), a composite material (e.g., carbon fiber reinforced polymer), or any other rigid material. While certain geometries of brackets and structural support members are provided as examples in the current specification, it will be appreciated by those of skill in the art that other geometries may be implemented without departing from the scope of the present disclosure. For example, the teachings of the present disclosure are equally applicable to a bracket and/or a structural support member comprising a standardized metal component. Such standardized metal components can comprise steel members as defined in "Standard Specification for General Requirements for Rolled Structural Steel Bars, Plates, Shapes, and Sheet Piling" (ASTM A6/A6M), developed and published by ASTM International of West Conshohocken, Pa., USA), or other rigid members with physical characteristics defined by another standards developing organization. In another example, the bracket and/or the structural support member is a plate made of a rigid material. In such an example, an elastomer, located between the plates, may reduce noise and vibration transfer between the such plates.

The mounts disclosed herein include an elastomer. The elastomer has a prescribed stiffness to reduce the transmission of vibrations from one part of the aircraft to other parts of the aircraft. The elastomer may comprise any rubber-like material. For example, the elastomer may comprise natural rubber (i.e., derived from latex), synthetic rubber (e.g., ethylene propylene diene monomer (EPDM) rubber or any other derived from petroleum), silicone rubber (e.g., a silicon polymer containing oxygen, carbon, and/or hydrogen). Each mount has physical properties including a static spring rate (i.e., static stiffness) and a dynamic spring (i.e., dynamic stiffness). The static spring rate describes a relationship between a force applied to the elastomer relative to the distance by which the elastomer deflects based on that force. For the static spring rate, the elastomer is loaded with the force in a steady state (i.e., constant, non-moving force or a very slowly applied load). Similarly, the dynamic spring rate describes a relationship between a force applied to the elastomer relative to the distance by which the elastomer deflects based on that force. However, for the dynamic spring rate, the elastomer is dynamically loaded with the force in a non-steady state (i.e., a changing load, or a quickly applied load). For a given material, the dynamic stiffness is generally higher that than the static stiffness due, e.g., to natural hysteresis (internal damping) present in rubber-like materials.

The elastomers of the present disclosure are tuned to avoid amplifying an N-per-rev frequency of the aircraft on which it located and to attenuate noise. The elastomers are tuned such the attached aircraft system (e.g. engine, compressor, gearboxes, AGB, APU, ECU, and the like) produces a frequency response that avoids the N-per-rev frequency. Such tuning is achieved by adjusting properties of the elastomers to influence a natural frequency of the combined system (i.e., a combination of the elastomeric mount and the aircraft system). In many cases, the tuning requires ensuring that the natural frequency of the combined system does not coincide with the N-per-rev frequency (i.e., is separated from the N-per-rev frequency by a threshold frequency amount). The required frequency separation depends on the damping of the elastomeric mounts and the shape of the mode (or mode shape) being excited at the natural frequency. Those of skill in the art will appreciate that the mode shape is determined by applying structural dynamics principles to identify the shape of deformation at a particular mode of vibration. As an example of such tuning, by selecting a dynamic stiffness that produces a natural frequency of the combined system that is separated from the N-per-rev frequency by at least 10 percent, a frequency response of the combined system attenuates noise from the aircraft system even when being vibrated at N-per-rev (e.g., N-per-rev vibrations received from the rotor system via the airframe). In other words, the N-per-rev vibrations do not excessively amplify the vibrations of the aircraft system. In contrast, if the natural frequency of the combined system was approximately equal to N-per-rev, then the N-per-rev vibrations would excessively amplify the vibrations of the aircraft system (and vice-versa). Such amplification is prevented based on the separation between the N-per-rev and the natural frequency of the combined system.

A dynamic stiffness for the elastomer is determined to produce a natural frequency of the combined system that is separated from the N-per-rev frequency by at least 10 percent. For example, when the N-per-rev is 25 Hz (e.g., for a rotor system including 5 blades), the dynamic stiffness may be selected to produce a natural frequency of 27.5 Hz (which is 10 percent above the N-per-rev) or 22.5 Hz (which is 10 percent below the N-per-rev). The following equation (E1) expresses the undamped natural frequency ($f_n$, in units of Hz) of the combined system represented as a 2 degree-of-freedom system with equal masses connected with a spring/damper system as a function of the dynamic stiffness (k, in units of lb/in) to:

$$f_n = \frac{\sqrt{2k}}{2\pi} \qquad \text{E1}$$

Rewriting equation E1 to express the dynamic stiffness, k, as a function of the undamped natural frequency, $f_n$, produces equation (E2).

$$k = 2\pi^2 f_n^2 \qquad \text{E2}$$

The equation E2 can be used to determine the dynamic stiffness based on the desired natural frequency of the combined system, which in this example may be either 27.5 Hz (for 10% above N-per-rev) or 22.5 Hz (for 10% below N-per-rev). For example, the equation E2 yields a dynamic stiffness of about 10,000 lb/in to produce a natural frequency of the combined system that is 10 percent below N-per-rev (i.e., $f_n$=22.5 Hz). Similarly, the equation E2 yields a dynamic stiffness of about 14,900 lb/in to produce a natural frequency of the combined system that is 10 percent above N-per-rev (i.e., $f_n$=27.5 Hz). The static stiffness of the elastomer can prevent the component of the aircraft system from moving beyond acceptable tolerances while supporting the weight of the component. The static stiffness is related to the dynamic stiffness and the amount of damping provided by the elastomer. In some examples, the static stiffness and the dynamic stiffness are related to one another by a ratio. For example, a static-to-dynamic stiffness ratio may be greater than or equal to 1.1, less than or equal to 1.5, or a combination thereof. In a particular example, the static-to-dynamic stiffness ratio lies within the range of 1.1 to 1.5, where 1.1 would correspond to a low-damped elastomer and 1.5 would correspond to a high-damped elastomer. Thus, for the dynamic stiffness of 10,000 lb/in using a static-to-dynamic stiffness ratio equal to 1.1 produces a static stiffness of about 9,100 lb/in. Similarly, for the dynamic stiffness of 14,900 lb/in using a static-to-dynamic stiffness ratio equal to 1.5 produces a static stiffness of about 13,500 lb/in. Thus, both the dynamic stiffness and the static stiffness of the elastomer can be determined based on the N-per-rev.

The following equation (E3) expresses the response of the combined system. The response is the magnitude of acceleration, |a| (typically in units of standard acceleration due to gravity (or g's), in/s², or m/s²), which, in this case, is normalized by the rigid body acceleration of the static system (i.e. the applied force magnitude at any frequency is equal to the total mass of the combined system).

$$|a| = \frac{\sqrt{(1 - R^2 + 4\zeta^2 R^2)^2 + (2\zeta R^3)^2}}{(1 - R^2)^2 + (2\zeta R^3)^2} \qquad \text{E3}$$

In equation E3, R is a ratio between the excitation frequency (f) and the natural frequency ($f_n$), where (R=f/$f_n$); and ζ (zeta) is the critical damping ratio. The excitation frequency, f, is the frequency at which the system (i.e., a combination of the elastomeric mount and the aircraft system) is excited (or vibrated). For example, this would be the frequency at which the aircraft system vibrates. The natural frequency, $f_n$, is the natural frequency of the combined system. Though the combined system includes some damping, the damping is often relatively minor (i.e., in the range of 2-4%). While the natural frequency can shift with high damping (relative to the undamped case), the relatively minor damping is not large enough to cause such a shift in natural frequency. Thus, it is assumed that a damped natural frequency of the combined system is approximately equal to the undamped natural frequency. Consequently, the natural frequency used in equations E1 and E2 (i.e., $f_n$=22.5 Hz or 27.5 Hz) is also used in the below example of FIG. 17.

Figure 17:
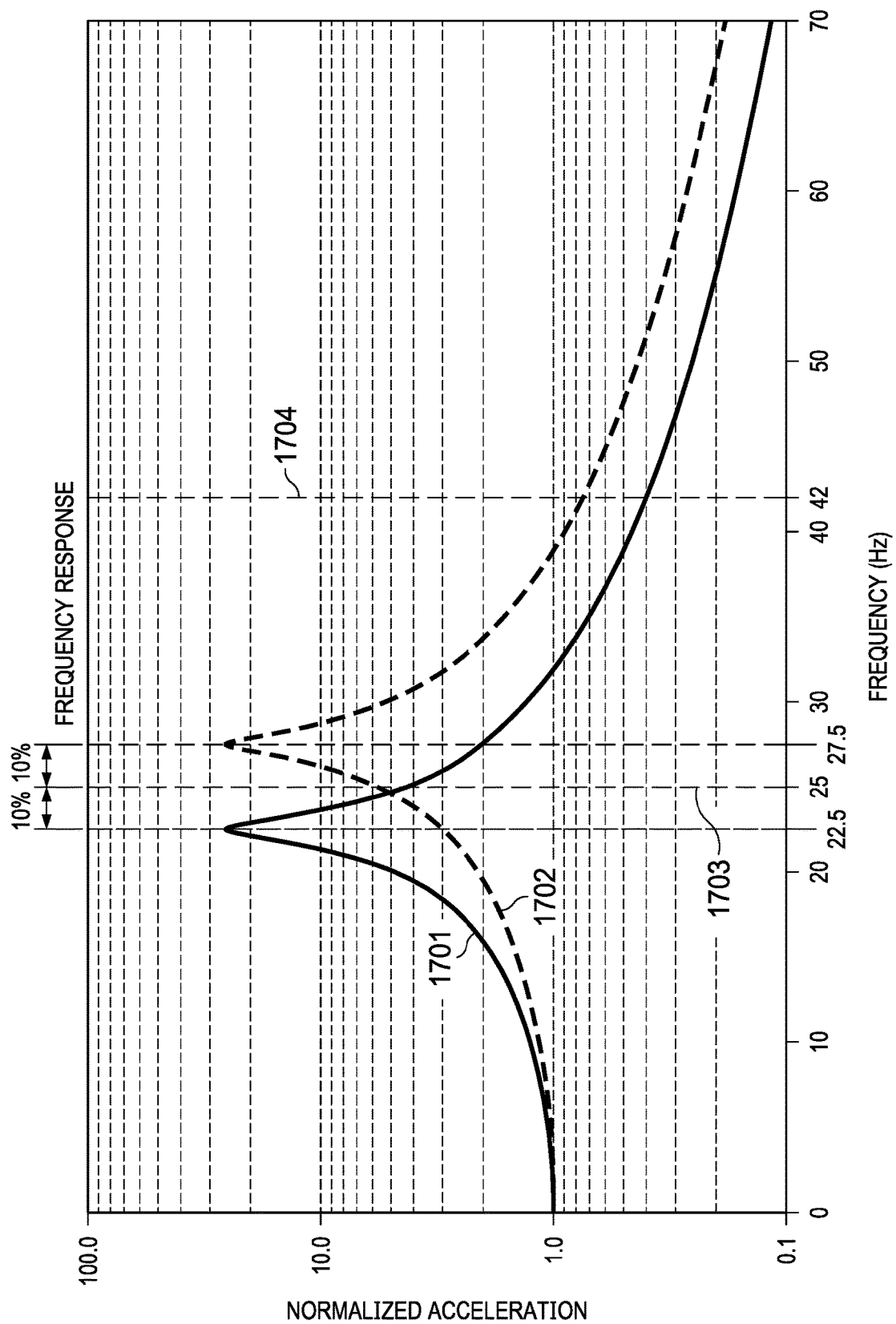
FIG. 17 is a graph of frequency response for an example noise reducing elastomer in accordance with certain embodiments.

Turning to FIG. 17, FIG. 17 shows frequency responses for example elastomers based on the equation E3. The variables used in the equation E3 for generating the plot in FIG. 17 are based on an example in which the N-per-rev is 25 Hz (as described above). These examples are also based on an aircraft system producing vibrations at about 42 Hz. In particular, the variables are as follows: the critical damping ratio is about 2% (i.e., =0.02); $f_n$=25 Hz; f is an independent variable and varies from about 0.1 Hz to 70 Hz.

The plots illustrate the relative acceleration generated by each elastomer when it is vibrated at various frequencies. In general, the system amplifies frequencies at which the curve is above 1.0 normalized acceleration and the system attenuates frequencies at which the curve is below 1.0 normalized acceleration. The curve 1701 corresponds to an elastomer that has a dynamic stiffness is 10,000 lb/in, which produces a natural frequency of 22.5 Hz, or 10% below N-per-rev. The curve 1702 corresponds to an elastomer that has a dynamic stiffness is 14,900 lb/in, which produces a natural frequency of 27.5 Hz, or 10% above N-per-rev. The line 1704 corresponds to the excitation frequency of the aircraft system 42 Hz (i.e., a first frequency). The line 1703 corresponds to the N-per-rev frequency, 25 Hz (i.e., a second frequency). The curves 1701 and 1702 illustrate that the corresponding mount is operable to attenuation vibrations at a 42 Hz and is not resonant when subjected to vibrations at the N-per-rev frequency, 25 Hz.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A mount comprising:
   a structural support member configured to transfer a weight of a component of a rotorcraft to an airframe of the rotorcraft, wherein the component of the rotorcraft produces vibrations at a first frequency and wherein rotors of the rotorcraft cause the airframe of the rotorcraft to vibrate at a second frequency;
   a bracket directly attached to the component of the rotorcraft and configured to receive the vibrations at the first frequency; and
   an elastomer fitted between and in direct contact with both the structural support member and the bracket and configured to receive the vibrations at the first frequency and the vibrations at the second frequency, wherein a dynamic stiffness of the elastomer produces a natural frequency of a combination of the rotorcraft component and the mount that attenuates noise caused by the vibrations at the first frequency by isolating the vibrations at the first frequency from reaching the airframe of the rotorcraft and the natural frequency of the combination of the rotorcraft component and the mount is separated from the second frequency by about 10 percent,
   wherein the elastomer comprises an opening in which a portion of the bracket nests, and the structural support member comprises another opening in which the elastomer nests.

2. The mount of claim 1, further comprising:
   a rigid attachment configured to rigidly affix the structural support member to the airframe of the rotorcraft.

3. The mount of claim 1, wherein the structural support member comprises one selected from the group consisting of: a strut, a plate, a cylindrical shell, a tripod, and a bipod.

4. The mount of claim 1, wherein a shape of the elastomer is one selected from the group consisting of: a cylinder, a ring, and a hemisphere.

5. The mount of claim 1, wherein the second frequency is generated by the rotors of the aircraft during forward flight.

6. The mount of claim 1, wherein the component comprises one selected from the group consisting of a gearbox, a compressor, an engine, an electrical motor.

7. A rotorcraft comprising:
   an airframe configured to support components of the rotorcraft, the components comprising:
   an aircraft system comprising at least one oscillating element, wherein the aircraft system is configured to produce vibrations at a first frequency based on oscillations of the at least one oscillating element;
   a rotor system comprising a plurality of rotors configured to rotate and generate thrust to propel the rotorcraft, wherein the plurality of rotors causes the rotor system to vibrate the airframe at a second frequency during rotation; and
   a mount configured to couple the aircraft system to the airframe and to attenuate noise caused by the vibrations at the first frequency, the mount comprising:
   a structural support member configured to transfer a weight of the aircraft system to the airframe,
   a bracket directly attached to the component of the rotorcraft and configured to receive the vibrations at the first frequency, and
   an elastomer fitted between and in direct contact with both the structural support member and the bracket and configured to receive the vibrations at the first frequency and the vibrations at the second frequency, wherein a dynamic stiffness of the elastomer produces a natural frequency of a combination of the rotorcraft component and the mount that attenuates noise caused by the vibrations at the first frequency by isolating the vibrations at the first frequency from reaching the airframe of the rotorcraft and the natural frequency of the combination of the rotorcraft component and the mount is separated from the second frequency by about 10 percent,
   wherein the elastomer comprises an opening in which a portion of the bracket nests, and the structural support member comprises another opening in which the elastomer nests.

8. The rotorcraft of claim 7, wherein the structural support member comprises one selected from the group consisting of: a strut, a plate, and a tripod, a bipod.

* * * * *